(12) United States Patent
Jin et al.

(10) Patent No.: US 11,063,640 B2
(45) Date of Patent: Jul. 13, 2021

(54) PRECODING VECTOR INDICATING METHOD, PRECODING VECTOR DETERMINING METHOD, RECEIVE END DEVICE, AND TRANSMIT END DEVICE

(71) Applicant: HUAWEI TECHNOLOGIES CO., LTD., Guangdong (CN)

(72) Inventors: Huangping Jin, Shanghai (CN); Wei Han, Shanghai (CN); Xiaoyan Bi, Shanghai (CN); Peng Shang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/459,581

(22) Filed: Jul. 1, 2019

(65) Prior Publication Data

US 2019/0326962 A1   Oct. 24, 2019

Related U.S. Application Data

(63) Continuation of application No. PCT/CN2018/071459, filed on Jan. 4, 2018.

(30) Foreign Application Priority Data

Jan. 5, 2017 (CN) .......................... 201710008458.5

(51) Int. Cl.
*H04B 7/0456* (2017.01)
*H04B 7/06* (2006.01)

(52) U.S. Cl.
CPC ......... *H04B 7/0456* (2013.01); *H04B 7/0634* (2013.01); *H04B 7/0639* (2013.01)

(58) Field of Classification Search
None
See application file for complete search history.

(56) References Cited

U.S. PATENT DOCUMENTS

| 8,755,451 B2 * | 6/2014 | Jung | ...................... H04B 7/024 375/267 |
| 9,312,937 B2 | 4/2016 | Ko et al. | |

(Continued)

FOREIGN PATENT DOCUMENTS

| CN | 102246480 A | 11/2011 |
| CN | 102571295 A | 7/2012 |

(Continued)

OTHER PUBLICATIONS

Ricardo Blasco-Serrano et al., "Polar Codes for Cooperative Relaying",IEEE Transactions on Communications, vol. 60, No. 11, Nov. 2012,total 11 pages.

(Continued)

*Primary Examiner* — Khaled M Kassim
(74) *Attorney, Agent, or Firm* — Womble Bond Dickinson (US) LLP

(57) ABSTRACT

Embodiments of the present invention provide a precoding vector indicating method, a precoding vector determining method, a receive end device, and a transmit end device. The precoding vector indicating method includes: determining a plurality of component vectors of an ideal precoding vector and a weight of each component vector based on at least one basic codebook, where each component vector is a column vector of one of the at least one basic codebook; and sending a precoding vector indicator, where the precoding vector indicator is used to indicate the plurality of component vectors and the weight of each component vector. The embodiments of the present invention further provide a precoding vector determining method, a receive end device, and a transmit end device. In the technical solutions provided in the embodiments of the present invention, a basic codebook is constructed based on a plurality of parameters, so that the basic codebook can be used to more accurately describe a channel environment. In this way, a precoding (Continued)

vector determined based on the basic codebook provided in the embodiments of the present invention can more accurately match a channel, thereby improving a precoding effect.

15 Claims, 5 Drawing Sheets

(56) References Cited

U.S. PATENT DOCUMENTS

| | | | | |
|---|---|---|---|---|
| 2007/0297529 | A1* | 12/2007 | Zhou | H04B 7/0663 375/267 |
| 2009/0274227 | A1 | 11/2009 | Kim et al. | |
| 2010/0150267 | A1 | 6/2010 | Zangi | |
| 2012/0113830 | A1 | 5/2012 | Zhu et al. | |
| 2012/0257683 | A1* | 10/2012 | Schwager | H04L 27/367 375/257 |
| 2014/0133317 | A1* | 5/2014 | Chen | H04B 7/0413 370/252 |
| 2015/0207547 | A1* | 7/2015 | Ko | H04B 7/0617 370/252 |
| 2016/0142117 | A1 | 5/2016 | Rahman et al. | |
| 2017/0222699 | A1* | 8/2017 | Scherb | H04B 7/0456 |
| 2018/0212656 | A1 | 7/2018 | Zhao et al. | |
| 2018/0241457 | A1* | 8/2018 | Lee | H04J 11/00 |
| 2018/0324730 | A1* | 11/2018 | Lee | H04W 48/08 |
| 2019/0089428 | A1* | 3/2019 | Bethanabhotla | H04B 7/0617 |

FOREIGN PATENT DOCUMENTS

| | | |
|---|---|---|
| CN | 103780331 A | 5/2014 |
| CN | 103795450 A | 5/2014 |
| CN | 105009492 A | 10/2015 |
| CN | 106160926 A | 11/2016 |
| CN | 106301506 A | 1/2017 |
| KR | 101467839 B1 | 12/2014 |

OTHER PUBLICATIONS

Erdal Arikan, "Channel Polarization: A Method for Constructing Capacity-Achieving Codes for Symmetric Binary-Input Memoryless Channels", IEEE Transactions on Information Theory, vol. 55, No. 7, Jul. 2009, total 23 pages.

Xinwei, "Advanced CSI feedback and simulation results",3GPP TSG RAN WG1 Meeting #86 R1-166581, Gothenburg, Sweden, Aug. 22-26, 2016, Total 5 Pages.

* cited by examiner

PRECODING VECTOR INDICATING METHOD, PRECODING VECTOR DETERMINING METHOD, RECEIVE END DEVICE, AND TRANSMIT END DEVICE

CROSS-REFERENCE TO RELATED APPLICATIONS

This application is a continuation of International Application No. PCT/CN2018/071459, filed on Jan. 4, 2018, which claims priority to Chinese Patent Application No. 201710008458.5, filed on Jan. 5, 2017. The disclosures of the aforementioned applications are herein incorporated by reference in their entireties.

TECHNICAL FIELD

Embodiments of the present invention relate to the precoding technologies, and in particular, to a precoding vector indicating method, a precoding vector determining method, a receive end device, and a transmit end device.

BACKGROUND

Emergence of a Multiple Input Multiple Output (MIMO) technology brings a revolutionary change to wireless communication. In the MIMO technology, a plurality of antennas are deployed on a transmit end device and a receive end device, performance of a wireless communications system can be significantly improved. For example, in a diversity scenario, the MIMO technology can effectively improve transmission reliability. In a multiplexing scenario, the MIMO technology can greatly increase a transmission throughput.

In a MIMO system, a precoding technology is usually used to improve a channel, so as to improve a spatial multiplexing effect. Specifically, in the precoding technology, a precoding matrix that matches a channel is used to process a data stream obtained after spatial multiplexing (referred to as a spatial stream below), so as to precode the channel and improve received quality of the spatial stream.

Each spatial stream obtained after spatial multiplexing is corresponding to a column vector of a precoding matrix. In a precoding process, a transmit end device precodes the spatial stream by using the column vector. Therefore, the column vector may also be referred to as a precoding vector. The precoding vector may be determined by a receive end device based on a codebook and fed back to the transmit end device. The codebook is a set of a series of candidate vectors, and in the codebook, one candidate vector that most matches a channel, or a weighted sum of a plurality of candidate vectors, may be used as a precoding vector. However, a real channel environment is very complex, and a channel environment cannot be accurately described based on an existing codebook. Consequently, a precoding vector determined based on the existing codebook can only roughly match a channel, and a precoding effect is limited. It can be learned that a codebook may be required to more accurately describe a channel environment.

SUMMARY

In view of the above, it is necessary to provide a precoding vector indicating method, to improve a precoding effect. A precoding vector determining method is also provided, to improve a precoding effect. A receive end device is also provided, to improve a precoding effect. A transmit end device is also provided, to improve a precoding effect.

According to a first aspect of the present invention, a precoding vector indicating method is provided, and the precoding vector indicating method includes:

determining a plurality of component vectors of an ideal precoding vector and a weight of each component vector based on at least one basic codebook, where each component vector is a column vector of one of the at least one basic codebook; and sending a precoding vector indicator, where the precoding vector indicator is used to indicate the plurality of component vectors and the weight of each component vector.

According to a second aspect of the present invention, a precoding vector determining method is provided, and the precoding vector determining method includes:

receiving a precoding vector indicator, where the precoding vector indicator is used to indicate a plurality of component vectors of an ideal precoding vector and a weight of each component vector that are determined based on at least one basic codebook, and each component vector is a column vector of one of the at least one basic codebook; and determining the ideal precoding vector based on the plurality of component vectors and the weight of each component vector.

According to a third aspect of the present invention, a receive end device is provided, and the receive end device includes:

a determining module, configured to determine a plurality of component vectors of an ideal precoding vector and a weight of each component vector based on at least one basic codebook, where each component vector is a column vector of one of the at least one basic codebook; and a sending module, configured to send a precoding vector indicator, where the precoding vector indicator is used to indicate the plurality of component vectors and the weight of each component vector.

According to a fourth aspect of the present invention, a transmit end device is provided, and the transmit end device includes:

a receiving module, configured to receive a precoding vector indicator, where the precoding vector indicator is used to indicate a plurality of component vectors of an ideal precoding vector and a weight of each component vector that are determined based on at least one basic codebook, and each component vector is a column vector of one of the at least one basic codebook;

and a determining module, configured to determine the ideal precoding vector based on the plurality of component vectors and the weight of each component vector.

In one embodiment, the at least one basic codebook is one basic codebook.

In one embodiment, the basic codebook is:

$$B = \begin{bmatrix} G & G \\ G_\psi & -G_\psi \end{bmatrix},$$

where

B is the basic codebook;

$G = (D_{N_1,O_1}) \otimes (D_{N_2,O_2})$, where an element $d(m_1,n_1)$ in a matrix $D_{N_1,O_1}$ is:

$$d(m_1, n_1) = e^{j\frac{2\pi}{O_1 N_1} m_1 n_1} \text{ or } d(m_1, n_1) = e^{-j\frac{2\pi}{O_1 N_1} m_1 n_1};$$

$O_1$ and $N_1$ are preset values, both $O_1$ and $N_1$ are positive integers, $0 \le m_1 \le N_1-1$, and $0 \le n_1 \le O_1 N_1-1$;
an element $d(m_2,n_2)$ in a matrix $D_{N_2,O_2}$ is:

$$d(m_2, n_2) = e^{j\frac{2\pi}{O_2 N_2} m_2 n_2} \text{ or } d(m_2, n_2) = e^{-j\frac{2\pi}{O_2 N_2} m_2 n_2};$$

$O_2$ and $N_2$ are preset values, both $O_2$ and $N_2$ are positive integers, $0 \le m_2 \le N_2-1$, and $0 \le n_2 \le O_2 N_2-1$; and
$\psi$ is a diagonal matrix, and an $i^{th}$ element $\Lambda_{ii}$ on a main diagonal of the diagonal matrix is:
$\Lambda_{ii} = e^{jx}$, where
$1 \le i \le O_1 O_2 N_1 N_2$, $x$ is a codebook parameter, and $0 \le x \le 2\pi$.
In one embodiment, the basic codebook is:

$$B = \begin{bmatrix} G & G \\ G_\psi & -G_\psi \end{bmatrix},$$

where
B is the basic codebook;
$G = (L_{N_1}^{k_1} D_{N_1}) \otimes (L_{N_2}^{k_2} D_{N_2})$, where
an element $d(m_1,n_1)$ in a matrix $D_{N_1}$ is:

$$d(m_1, n_1) = e^{j\frac{2\pi}{N_1} m_1 n_1} \text{ or } d(m_1, n_1) = e^{-j\frac{2\pi}{N_1} m_1 n_1};$$

$N_1$ is a preset value, $N_1$ is a positive integer, $0 \le m_1 \le N_1-1$, and $0 \le n_1 \le N_1-1$;
an element $d(m_2,n_2)$ in a matrix $D_{N_2}$ is:

$$d(m_2, n_2) = e^{j\frac{2\pi}{N_2} m_2 n_2} \text{ or } d(m_2, n_2) = e^{-j\frac{2\pi}{N_2} m_2 n_2};$$

$N_2$ is a preset value, $N_2$ is a positive integer, $0 \le m_2 \le N_2-1$, and $0 \le n_2 \le N_2-1$;
$L_{N_1}^{k_1}$ is a diagonal matrix; and if $$d(m_1, n_1) = e^{j\frac{2\pi}{N_1} m_1 n_1},$$

the diagonal matrix $L_{N_1}^{k_1}$ is:

$$L_{N_1}^{k_1} = \operatorname{diag}\left(\left[e^{-j\frac{2\pi k_1}{O_1 N_1} \cdot 0}, e^{-j\frac{2\pi k_1}{O_1 N_1} \cdot 1}, \ldots, e^{-j\frac{2\pi k_1}{O_1 N_1}(N_1-1)}\right]\right),$$

or
if $$d(m_1, n_1) = e^{-j\frac{2\pi}{N_1} m_1 n_1},$$

the diagonal matrix $L_{N_1}^{k_1}$ is:

$$L_{N_1}^{k_1} = \operatorname{diag}\left(\left[e^{j\frac{2\pi k_1}{O_1 N_1} \cdot 0}, e^{j\frac{2\pi k_1}{O_1 N_1} \cdot 1}, \ldots, e^{j\frac{2\pi k_1}{O_1 N_1}(N_1-1)}\right]\right),$$

$O_1$ is a preset value, $O_1$ is a positive integer, $k_1$ is a first codebook parameter, $k_1$ is an integer, and $0 \le k_1 \le O_1-1$; and
$L_{N_2}^{k_2}$ is a diagonal matrix; and if $$d(m_2, n_2) = e^{j\frac{2\pi}{N_2} m_2 n_2},$$

the diagonal matrix $L_{N_2}^{k_2}$ is:

$$L_{N_2}^{k_2} = \operatorname{diag}\left(\left[e^{-j\frac{2\pi k_2}{O_2 N_2} \cdot 0}, e^{-j\frac{2\pi k_2}{O_2 N_2} \cdot 1}, \ldots, e^{-j\frac{2\pi k_2}{O_2 N_2}(N_2-1)}\right]\right),$$

or
if $$d(m_2, n_n) = e^{-j\frac{2\pi}{N_2} m_2 n_2},$$

the diagonal matrix $L_{N_2}^{k_2}$ is:

$$L_{N_2}^{k_2} = \operatorname{diag}\left(\left[e^{j\frac{2\pi k_2}{O_2 N_2} \cdot 0}, e^{j\frac{2\pi k_2}{O_2 N_2} \cdot 1}, \ldots, e^{j\frac{2\pi k_2}{O_2 N_2}(N_2-1)}\right]\right),$$

$O_2$ is a preset value, $O_2$ is a positive integer, $k_2$ is a second codebook parameter, $k_2$ is an integer, and $0 \le k_2 \le O_2-1$; and
$\psi$ is a diagonal matrix, and an $i^{th}$ element $\Lambda_{ii}$ on a main diagonal of the diagonal matrix is:
$\Lambda_{ii} = e^{jx}$, where
$1 \le i \le O_1 O_2 N_1 N_2$, $x$ is a third codebook parameter, and $0 \le x \le 2\pi$.
In one embodiment, the basic codebook is:

$$B = \begin{bmatrix} (L_{N_1}^{k_1} D_{N_1}) \otimes (L_{N_2}^{k_2} D_{N_2}) & (L_{N_1}^{k_1} D_{N_1}) \otimes (L_{N_2}^{k_2} D_{N_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix},$$

where
B is the basic codebook, and an element $d(m_1,n_1)$ in a matrix $D_{N_1}$ is:

$$d(m_1, n_1) = e^{j\frac{2\pi}{N_1} m_1 n_1} \text{ or } d(m_1, n_1) = e^{-j\frac{2\pi}{N_1} m_1 n_1};$$

$N_1$ is a preset value, $N_1$ is a positive integer, $0 \le m_1 \le N_1-1$, and $0 \le n_1 \le N_1-1$;
an element $d(m_2,n_2)$ in a matrix $D_{N_2}$ is:

$$d(m_2, n_2) = e^{j\frac{2\pi}{N_2} m_2 n_2} \text{ or } d(m_2, n_2) = e^{-j\frac{2\pi}{N_2} m_2 n_2};$$

$N_2$ is a preset value, $N_2$ is a positive integer, $0 \le m_2 \le N_2-1$, and $0 \le n_2 \le N_2-1$;

$L_{N_1}^{k_1}$ is a diagonal matrix; and if $$d(m_1, n_1) = e^{j\frac{2\pi}{N_1}m_1 n_1},$$

the diagonal matrix $L_{N_1}^{k_1}$ is:

$$L_{N_1}^{k_1} = \text{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1 - 1)}\right]\right),$$

if $$d(m_1, n_1) = e^{-j\frac{2\pi}{N_1}m_1 n_1},$$

the diagonal matrix $L_{N_1}^{k_1}$ is:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1 - 1)}\right]\right),$$

where $O_1$ is a preset value, $O_1$ is a positive integer, $k_1$ is a first codebook parameter, $k_1$ is an integer, and $0 \leq k_1 \leq O_1 - 1$;

$L_{N_2}^{k_2}$ is a diagonal matrix; and if $$d(m_2, n_2) = e^{j\frac{2\pi}{N_2}m_2 n_2},$$

the diagonal matrix $L_{N_2}^{k_2}$ is:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2 - 1)}\right]\right),$$

or
if $$d(m_2, n_n) = e^{-j\frac{2\pi}{N_2}m_2 n_2},$$

the diagonal matrix $L_{N_2}^{k_2}$ is:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2 - 1)}\right]\right),$$

where $O_2$ is a preset value, $O_2$ is a positive integer, $k_2$ is a second codebook parameter, $k_2$ is an integer, and $0 \leq k_2 \leq O_2 - 1$;

$R_{N_1}^{q_1}$ is a diagonal matrix; and if $$d(m_1, n_1) = e^{j\frac{2\pi}{N_1}m_1 n_1},$$

the diagonal matrix $R_{N_1}^{q_1}$ is:

$$R_{N_1}^{q_1} = \text{diag}\left(\left[e^{j\frac{2\pi q_1}{Q_1 N_1} 0}, e^{j\frac{2\pi q_1}{Q_1 N_1} 1}, \ldots, e^{j\frac{2\pi q_1}{Q_1 N_1}(N_1 - 1)}\right]\right),$$

or
if $$d(m_1, n_1) = e^{-j\frac{n\pi}{N_1}m_1 n_1},$$

the diagonal matrix $R_{N_1}^{q_1}$ is:

$$R_{N_1}^{q_1} = \text{diag}\left(\left[e^{-j\frac{2\pi q_1}{Q_1 N_1} 0}, e^{-j\frac{2\pi q_1}{Q_1 N_1} 1}, \ldots, e^{-j\frac{2\pi q_1}{Q_1 N_1}(N_1 - 1)}\right]\right),$$

where $Q_1$ is a preset value, $Q_1$ is a positive integer, $q_1$ is a third codebook parameter, $q_1$ is an integer, and $-(Q_1 - 1) \leq q_1 \leq (Q_1 - 1)$; and $R_{N_2}^{k_2}$ is a diagonal matrix; and if $$d(m_2, n_2) = e^{j\frac{2\pi}{N_2}m_2 n_2},$$

the diagonal matrix $R_{N_2}^{q_2}$ is:

$$R_{N_2}^{q_2} = \text{diag}\left(\left[e^{j\frac{2\pi q_2}{Q_2 N_2} 0}, e^{j\frac{2\pi q_2}{Q_2 N_2} 1}, \ldots, e^{j\frac{2\pi q_2}{Q_2 N_2}(N_2 - 1)}\right]\right),$$

or
if $$d(m_2, n_n) = e^{-j\frac{2\pi}{N_2}m_2 n_2},$$

the diagonal matrix $R_{N_2}^{q_2}$ is:

$$R_{N_2}^{q_2} = \text{diag}\left(\left[e^{-j\frac{2\pi q_2}{Q_2 N_2} 0}, e^{-j\frac{2\pi q_2}{Q_2 N_2} 1}, \ldots, e^{-j\frac{2\pi q_2}{Q_2 N_2}(N_2 - 1)}\right]\right),$$

where $Q_2$ is a preset value, $Q_2$ is a positive integer, $q_2$ is a fourth codebook parameter, $q_2$ is an integer, and $-(Q_2 - 1) \leq q_2 \leq (Q_2 - 1)$.

In one embodiment, the basic codebook is:

$$B = \begin{bmatrix} \left(L_{N_1}^{k_1} D_{N_1} R_{N_1}^{p_1}\right) \otimes \left(L_{N_2}^{k_2} D_{N_2} R_{N_2}^{p_2}\right) & \left(L_{N_1}^{k_1} D_{N_1} R_{N_1}^{p_1}\right) \otimes \left(L_{N_2}^{k_2} D_{N_2} R_{N_2}^{p_2}\right) \\ \left(L_{N_1}^{k_1} D_{N_1} R_{N_1}^{q_1}\right) \otimes \left(L_{N_2}^{k_2} D_{N_2} R_{N_2}^{q_2}\right) & -\left(L_{N_1}^{k_1} D_{N_1} R_{N_1}^{q_1}\right) \otimes \left(L_{N_2}^{k_2} D_{N_2} R_{N_2}^{q_2}\right) \end{bmatrix},$$

B is the basic codebook, and an element $d(m_1, n_1)$ in a matrix $D_{N_1}$ is:

$$d(m_1, n_1) = e^{j\frac{2\pi}{N_1}m_1 n_1} \text{ or } d(m_1, n_1) = e^{-j\frac{2\pi}{N_1}m_1 n_1};$$

$N_1$ is a preset value, $N_1$ is a positive integer, $0 \leq m_1 \leq N_1-1$, and $0 \leq n_1 \leq N_1-1$;

an element $d(m_2,n_2)$ in a matrix $D_{N_2}$ is:

$$d(m_2, n_2) = e^{j\frac{2\pi}{N_2}m_2 n_2} \text{ or } d(m_2, n_2) = e^{-j\frac{2\pi}{N_2}m_2 n_2};$$

$N_2$ is a preset value, $N_2$ is a positive integer, $0 \leq m_2 \leq N_2-1$, and $0 \leq n_2 \leq N_2-1$;

$L_{N_1}^{k_1}$ is a diagonal matrix; and if $$d(m_1, n_1) = e^{j\frac{2\pi}{N_1}m_1 n_1},$$

the diagonal matrix $L_{N_1}^{k_1}$ is:

$$L_{N_1}^{k_1} = \text{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ is:

$$L_{N_1}^{k_1} = \text{diag}\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

where
$O_1$ is a preset value, $O_1$ is a positive integer, $k_1$ is a first codebook parameter, $k_1$ is an integer, and $0 \leq k_1 \leq O_1-1$;

$L_{N_2}^{k_2}$ is a diagonal matrix; and if $$d(m_2, n_2) = e^{j\frac{2\pi}{N_2}m_2 n_2},$$

the diagonal matrix $L_{N_2}^{k_2}$ is:

$$L_{N_2}^{k_2} = \text{diag}\left(\left[e^{j\frac{2\pi k_2}{O_2 N_2}0}, e^{j\frac{2\pi k_2}{O_1 N_2}1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ is:

$$L_{N_2}^{k_2} = \text{diag}\left(\left[e^{-\frac{2\pi k_2}{O_2 N_2}0}, e^{-j\frac{2\pi k_2}{O_1 N_2}1}, \ldots, e^{-j\frac{2\pi k_2}{O_2 N_2}(N_2-1)}\right]\right),$$

where
$O_2$ is a preset value, $O_2$ is a positive integer, $k_2$ is a second codebook parameter, $k_2$ is an integer, and $0 \leq k_2 \leq O_2-1$;

$R_{N_1}^{p_1}$ is a diagonal matrix; and if $$d(m_1, n_1) = e^{j\frac{2\pi}{N_1}m_1 n_1},$$

the diagonal matrix $R_{N_1}^{p_1}$ is:

$$R_{N_1}^{p_1} = \text{diag}\left(\left[e^{j\frac{2\pi p_1}{Q_1 N_1}0}, e^{j\frac{2\pi p_1}{Q_1 N_1}1}, \ldots, e^{j\frac{2\pi p_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{p_1}$ is:

$$R_{N_1}^{p_1} = \text{diag}\left(\left[e^{-j\frac{2\pi p_1}{Q_1 N_1}0}, e^{-j\frac{2\pi p_1}{Q_1 N_1}1}, \ldots, e^{-j\frac{2\pi p_1}{Q_1 N_1}(N_1-1)}\right]\right),$$

where
$Q_1$ is a preset value, $Q_1$ is a positive integer, $p_1$ is a third codebook parameter, $p_1$ is an integer, and $0 \leq p_1 \leq (Q_1-1)$;

$R_{N_2}^{p_2}$ is a diagonal matrix; and if $$d(m_2, n_2) = e^{j\frac{2\pi}{N_2}m_2 n_2},$$

the diagonal matrix $R_{N_2}^{p_2}$ is:

$$R_{N_2}^{p_2} = \text{diag}\left(\left[e^{j\frac{2\pi p_2}{Q_2 N_2}0}, e^{j\frac{2\pi p_2}{Q_2 N_2}1}, \ldots, e^{j\frac{2\pi p_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{p_2}$ is:

$$d(m_2, n_2) = e^{-j\frac{2\pi}{N_2}m_2 n_2},$$

where
$Q_2$ is a preset value, $Q_2$ is a positive integer, $p_2$ is a fourth codebook parameter, $p_2$ is an integer, and $0 \leq p_2 \leq (Q_2-1)$;

$R_{N_1}^{q_1}$ is a diagonal matrix; and if $$d(m_1, n_1) = e^{j\frac{2\pi}{N_1}m_1 n_1},$$

the diagonal matrix $R_{N_1}^{q_1}$ is:

$$R_{N_1}^{q_1} = diag\left(\left[e^{j\frac{2\pi q_1}{Q_3 N_1}0}, e^{j\frac{2\pi q_1}{Q_3 N_1}1}, \ldots, e^{j\frac{2\pi q_1}{Q_3 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ is:

$$R_{N_1}^{q_1} = diag\left(\left[e^{j\frac{2\pi q_1}{Q_3 N_1}0}, e^{j\frac{2\pi q_1}{Q_3 N_1}1}, \ldots, e^{j\frac{2\pi q_1}{Q_3 N_1}(N_1-1)}\right]\right),$$

where
$Q_3$ is a preset value, $Q_3$ is a positive integer, $q_1$ is a fifth codebook parameter, $q_1$ is an integer, and $0 \leq q_1 \leq (Q_3-1)$; and $R_{N_2}^{q_2}$ is a diagonal matrix; and if $$d(m_2, n_2) = e^{j\frac{2\pi}{N_1}m_2 n_2},$$

the diagonal matrix $R_{N_2}^{q_2}$ is:

$$R_{N_2}^{q_2} = diag\left(\left[e^{j\frac{2\pi q_2}{Q_4 N_2}0}, e^{j\frac{2\pi q_2}{Q_4 N_2}1}, \ldots, e^{j\frac{2\pi q_2}{Q_4 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ is:

$$R_{N_2}^{q_2} = diag\left(\left[e^{-j\frac{2\pi q_2}{Q_4 N_2}0}, e^{-j\frac{2\pi q_2}{Q_4 N_2}1}, \ldots, e^{-j\frac{2\pi q_2}{Q_4 N_2}(N_2-1)}\right]\right),$$

where
$Q_4$ is a preset value, $Q_4$ is a positive integer, $q_2$ is a sixth codebook parameter, $q_2$ is an integer, and $0 \leq q_2 \leq (Q_4-1)$.

In one embodiment, the basic codebook is:

$$B = \begin{bmatrix} (L_{N_1}^{k_1} D_{N_1} R_{N_1}^{q_1}) \otimes (L_{N_2}^{k_2} D_{N_2} R_{N_2}^{q_2}) & (L_{N_1}^{k_1} D_{N_1} R_{N_1}^{q_1}) \otimes (L_{N_2}^{k_2} D_{N_2} R_{N_2}^{q_2}) \\ (L_{N_1}^{k_1} D_{N_1}) \otimes (L_{N_2}^{k_2} D_{N_2}) & -(L_{N_1}^{k_1} D_{N_1}) \otimes (L_{N_2}^{k_2} D_{N_2}) \end{bmatrix}$$

B is the basic codebook, and an element $d(m_1, n_1)$ in a matrix $D_{N_1}$ is:

$$d(m_1, n_1) = e^{j\frac{2\pi}{N_1}m_1 n_1} \text{ or } d(m_1, n_1) = e^{-j\frac{2\pi}{N_1}m_1 n_1};$$

$N_1$ is a preset value, $N_1$ is a positive integer, $0 \leq m_1 \leq N_1-1$, and $0 \leq n_1 \leq N_1-1$;

an element $d(m_2, n_2)$ in a matrix $D_{N_2}$ is:

$$d(m_2, n_2) = e^{j\frac{2\pi}{N_2}m_2 n_2} \text{ or } d(m_2, n_2) = e^{-j\frac{2\pi}{N_2}m_2 n_2};$$

$N_2$ is a preset value, $N_2$ is a positive integer, $0 \leq m_2 \leq N_2-1$, and $0 \leq n_2 \leq N_2-1$;

$L_{N_1}^{k_1}$ is a diagonal matrix; and if $$d(m_1, n_1) = e^{j\frac{2\pi}{N_1}m_1 n_1},$$

the diagonal matrix $L_{N_1}^{k_1}$ is:

$$L_{N_1}^{k_1} = diag\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ is:

$$L_{N_1}^{k_1} = diag\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

where
$O_1$ is a preset value, $O_1$ is a positive integer, $k_1$ is a first codebook parameter, $k_1$ is an integer, and $0 \leq k_1 \leq O_1-1$; $L_{N_2}^{k_2}$ is a diagonal matrix; and if $$d(m_2, n_2) = e^{j\frac{2\pi}{N_2}m_2 n_2},$$

the diagonal matrix $L_{N_2}^{k_2}$ is:

$$L_{N_2}^{k_2} = diag\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ is:

$$L_{N_2}^{k_2} = diag\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

where $O_2$ is a preset value, $O_2$ is a positive integer, $k_2$ is a second codebook parameter, $k_2$ is an integer, and $0 \le k_2 \le O_2-1$;

$R_{N_1}^{q_1}$ is a diagonal matrix; and if $$d(m_1, n_1) = e^{j\frac{2\pi}{N_1}m_1 n_1},$$

the diagonal matrix $R_{N_1}^{q_1}$ is:

$$R_{N_1}^{q_1} = diag\left(\left[e^{j\frac{2\pi q_1}{Q_1 N_1}0}, e^{j\frac{2\pi q_1}{Q_1 N_1}1}, \ldots, e^{j\frac{2\pi q_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ is:

$$R_{N_1}^{q_1} = diag\left(\left[e^{-j\frac{2\pi q_1}{Q_1 N_1}0}, e^{-j\frac{2\pi q_1}{Q_1 N_1}1}, \ldots, e^{-j\frac{2\pi q_1}{Q_1 N_1}(N_1-1)}\right]\right),$$

where $Q_1$ is a preset value, $Q_1$ is a positive integer, $q_1$ is a third codebook parameter, $q_1$ is an integer, and $-(Q_1-1) \le q_1 \le (Q_1-1)$; and $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ is:

$$R_{N_2}^{q_2} = diag\left(\left[e^{j\frac{2\pi q_2}{Q_2 N_2}0}, e^{j\frac{2\pi q_2}{Q_2 N_2}1}, \ldots, e^{j\frac{2\pi q_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ is:

$$R_{N_2}^{q_2} = diag\left(\left[e^{-j\frac{2\pi q_2}{Q_2 N_2}0}, e^{-j\frac{2\pi q_2}{Q_2 N_2}1}, \ldots, e^{-j\frac{2\pi q_2}{Q_2 N_2}(N_2-1)}\right]\right),$$

where $Q_2$ is a preset value, $Q_2$ is a positive integer, $q_2$ is a fourth codebook parameter, $q_2$ is an integer, and $-(Q_2-1) \le q_2 \le (Q_2-1)$.

In one embodiment, for any one of the foregoing basic codebooks, an additional coefficient is configured for at least one block matrix in the basic codebook.

In one embodiment for any one of the foregoing basic codebooks, an additional coefficient is configured for at least one composition matrix in at least one block matrix in the basic codebook.

In the technical solutions provided in embodiments of the present invention, a basic codebook is constructed based on a plurality of parameters, so that the basic codebook can be used to more accurately describe a channel environment. In this way, a precoding vector determined based on the basic codebook provided in the embodiments of the present invention can more accurately match a channel, thereby improving a precoding effect.

DESCRIPTION OF EMBODIMENTS

Figure 1:
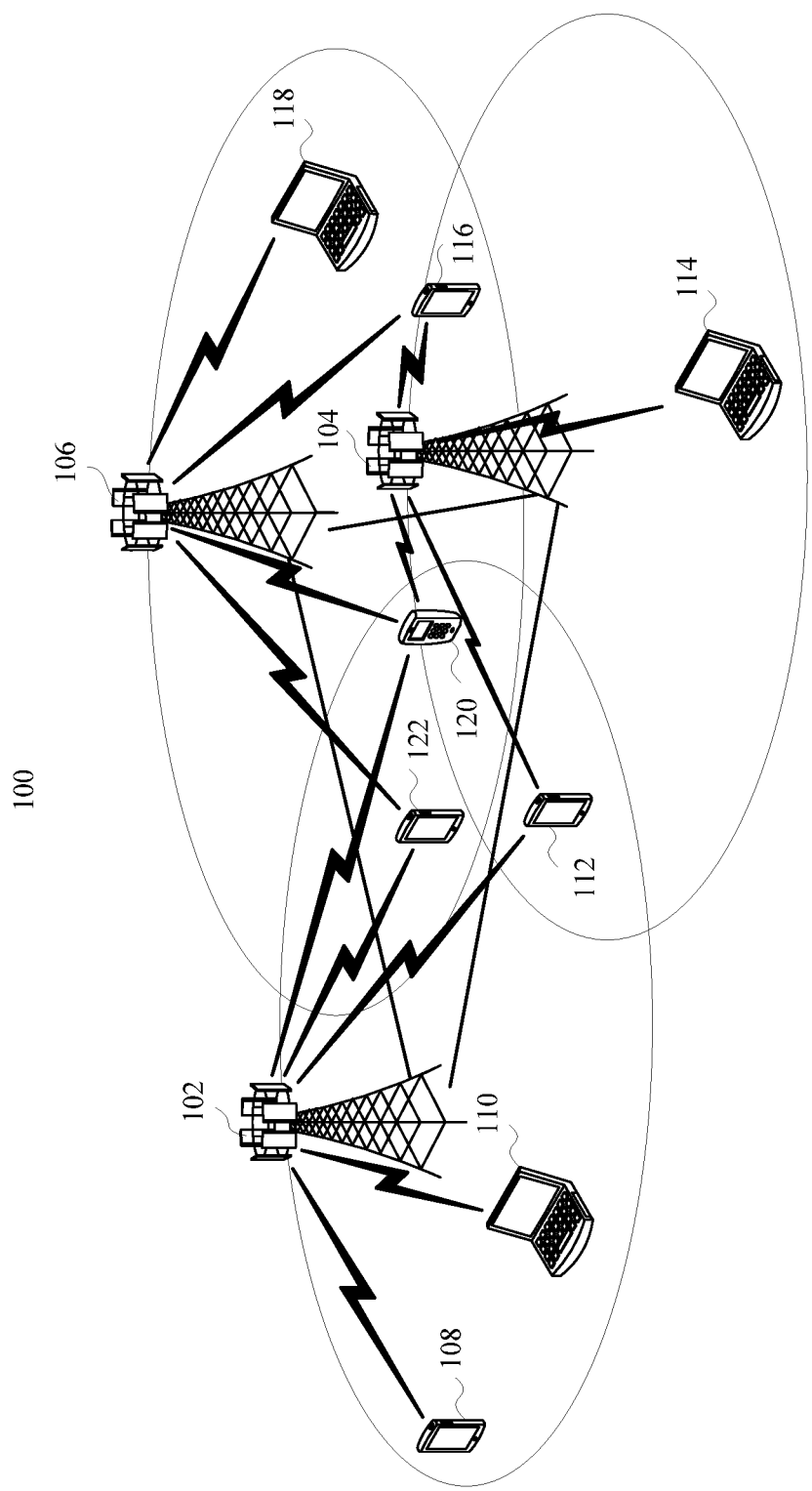
FIG. 1 is an example schematic diagram of a wireless communications network according to an embodiment of the present invention.

FIG. 1 is an example schematic diagram of a wireless communications network 100 according to an embodiment of the present invention. As shown in FIG. 1, the wireless communications network 100 includes base stations 102, 104, and 106 and terminal devices 108, 110, 112, 114, 116, 118, 120, and 122. The base stations 102, 104, and 106 may communicate with each other by using backhaul links (as shown by straight lines between the base stations 102, 104, and 106). The backhaul link may be a wired backhaul link (for example, an optical fiber or a copper cable) or a wireless backhaul link (for example, a microwave). The terminal devices 108, 110, 112, 114, 116, 118, 120, and 122 may communicate with the corresponding base stations 102, 104, and 106 by using radio links (for example, as shown by fold lines between the base stations 102, 104, and 106 and the terminal devices 108, 110, 112, 114, 116, 118, 120, and 122).

The base stations 102, 104, and 106 are configured to provide a wireless access service for the terminal devices 108, 110, 112, 114, 116, 118, 120, and 122. Specifically, each base station is corresponding to one service coverage area (which may be referred to as a cell, as shown by each elliptic area in FIG. 1). A terminal device that enters the area may communicate with a base station by using a radio signal, to accept a radio access service provided by the base station. Service coverage areas of the base stations may overlap. A terminal device in an overlapping area may receive radio signals from a plurality of base stations. Therefore, these base stations may coordinate with each other, to provide a service for the terminal device. For example, the plurality of base stations may provide a service for the terminal device in the overlapping area by using a coordinated multipoint (CoMP) technology. For example, as shown in FIG. 1, a service coverage area of the base station 102 overlaps a service coverage area of the base station 104, and the terminal device 112 falls into an overlapping area. Therefore, the terminal device 112 may receive radio signals from the base station 102 and the base station 104. The base station 102 and the base station 104 may coordinate with each other, to provide a service for the terminal device 112. For another example, as shown in FIG. 1, a common overlapping area exists in service coverage areas of the base stations 102, 104, and 106, and the terminal device 120 falls into the overlapping area. Therefore, the terminal device 120 may receive radio signals from the base stations 102, 104, and 106. The base stations 102, 104, and 106 may coordinate with each other, to provide a service for the terminal device 120.

Depending on a used wireless communications technology, a base station may also be referred to as a NodeBan evolved NodeB (eNodeB), an access point (AP), or the like. In addition, based on a size of a provided service coverage area, base stations may be classified into a macro base station for providing a macro cell a micro base station for providing a micro cell), a femto base station for providing a femto cell and the like. With continuous evolution of the wireless communications technologies, a future base station may use another name.

The terminal devices 108, 110, 112, 114, 116, 118, 120, and 122 may be various wireless communications devices having a wireless communication function, for example without limitation to, a mobile cellular phone, a cordless phone, a personal digital assistant (PDA), a smartphone, a notebook computer, a tablet computer, a wireless data card, a wireless modem (Modulator demodulator, Modem), or a wearable device such as a smartwatch. With emergence of an Internet of Things (IoT) technology, an increasing quantity of devices previously having no communication function, for example without limitation to, a household appliance, a transportation vehicle, a tool device, a service device, and a service facility, start to obtain a wireless communication function by configuring a wireless communications unit, to access a wireless communications network, and accept remote control. This type of devices have the wireless communication function because the wireless communications unit is configured for this type of devices, and therefore this type of devices also belong to wireless communications devices. In addition, the terminal devices 108, 110, 112, 114, 116, 118, 120, and 122 may also be referred to as mobile stations, mobile devices, mobile terminals, wireless terminals, handheld devices, clients, or the like.

The base stations 102, 104, and 106 and the terminal devices 108, 110, 112, 114, 116, 118, 120, and 122 may be equipped with a plurality of antennas, to support a MIMO technology. Further, the base stations 102, 104, and 106 and the terminal devices 108, 110, 112, 114, 116, 118, 120, and 122 may support not only a single user MIMO (SU-MIMO) technology but also a multi-user MIMO (MU-MIMO) technology. The MU-MIMO technology may be implemented based on a space division multiple access (SDMA) technology. Because a plurality of antennas are configured, the base stations 102, 104, and 106 and the terminal devices 108, 110, 112, 114, 116, 118, 120, and 122 may further flexibly support a single-input single-output (SISO) technology, a single-input multiple-output (SIMO) technology, and a multiple-input-single-output (MISO) technology, to implement various diversity (for example without limitation to, transmit diversity and receive diversity) and multiplexing technologies. The diversity technology may include, for example without limitation to, a transmit diversity (TD) technology and a receive diversity (RD) technology. The multiplexing technology may be a spatial multiplexing technology. In addition, the foregoing various technologies may further include a plurality of implementation solutions. For example, the transmit diversity technology may include diversity manners such as space-time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and diversity manners obtained through derivation and evolution, and by combining the foregoing various diversity manners. For example, currently, transmit diversity manners such as space time block coding (STBC), space frequency block coding (SFBC), and CDD are used in an LTE standard.

In addition, the base stations 102, 104, and 106 and the terminal devices 108, 110, 112, 114, 116, 118, 120, and 122 may communicate with each other by using various wireless communications technologies, for example without limitation to, a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an orthogonal frequency division multiple access (OFDMA) technology, a single carrier frequency division multiple access (SC-FDMA) technology, and a space division multiple access (SDMA) technology, and evolved and derived technologies of these technologies. As a radio access technology (RAT), the foregoing wireless communications technologies are adopted in many wireless communications standards, to construct various well-known wireless communications systems (or networks), including but not limited to a Global System for Mobile Communications (GSM), CDMA2000, Wideband CDMA (WCDMA), Wi-Fi defined in the 802.11 series of standards, Worldwide Interoperability for Microwave Access (WiMAX), Long Term Evolution (LTE), LTE-Advanced (LTE-A), evolved systems of these wireless communications systems, and the like. Unless otherwise specified, the technical solutions provided in the embodiments of the present invention may be applied to the foregoing various wireless communications technologies and wireless communications systems. In addition, the terms "system" and "network" can be interchanged.

It should be noted that the wireless communications network 100 shown in FIG. 1 is merely used as an example, and is not intended to limit the technical solutions of the present invention. A person skilled in the art should understand that in a specific implementation process, the wireless communications network 100 may further include other devices, for example without limitation to, a base station controller (BSC). In addition, a quantity of base stations and a quantity of terminal devices may also be configured based on a specific requirement.

Usually, in a communication process, a receive end device determines a channel matrix based on a reference signal transmitted by a transmit end device, determines a precoding matrix based on the channel matrix and a codebook, and feeds back the precoding matrix to the transmit end device. The transmit end device precodes to-be-transmitted data based on the precoding matrix, and sends the precoded data to the receive end device. In this specification, the receive end device may be the terminal device 108, 110, 112, 114, 116, 118, 120, or 122 shown in FIG. 1, and the transmit end device may be the base station 102, 104, or 106 shown in FIG. 1. Alternatively, the receive end device may be the base station 102, 104, or 106 shown in FIG. 1, and the transmit end device may be the terminal device 108, 110, 112, 114, 116, 118, 120, or 122 shown in FIG. 1. The embodiments of the present invention provide a precoding vector indicating solution, a precoding vector determining solution, and a corresponding receive end device and a corresponding transmit end device. The following describes in detail the technical solutions provided in the embodiments of the present invention.

Figures 2, 3:
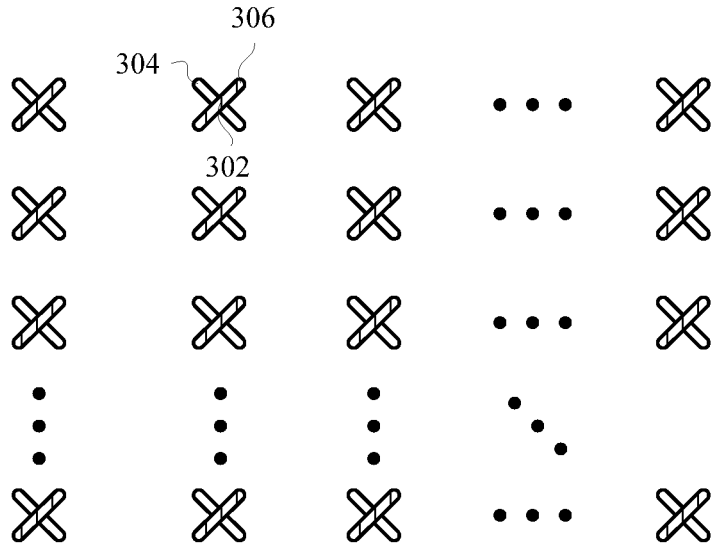
FIG. 2 is an example flowchart of a precoding vector indicating method according to an embodiment of the present invention.
FIG. 3 is an example schematic diagram of an antenna array according to an embodiment of the present invention.

FIG. 2 is an example flowchart of a precoding vector indicating method 200 according to an embodiment of the present invention. In a specific implementation process, the method 200 may be performed by, for example without limitation to, a receive end device.

In operation 202, a plurality of component vectors of an ideal precoding vector and a weight of each component vector are determined based on at least one basic codebook, where each component vector is a column vector of one of the at least one basic codebook.

In operation 204, a precoding vector indicator is sent, where the precoding vector indicator is used to indicate the plurality of component vectors and the weight of each component vector.

In a specific implementation process, the foregoing ideal precoding vector may be obtained by using a plurality of methods, and ideal precoding vectors obtained by using different methods may be different. For example, the foregoing ideal precoding vector may be obtained by performing singular value decomposition (SVD) on a channel matrix. Specifically, singular value decomposition is performed on the channel matrix, and the channel matrix may be decomposed into a form of a product of a left unitary matrix, a diagonal matrix, and a right unitary matrix. In a specific implementation process, a conjugate transpose matrix of the right unitary matrix may be used as an ideal precoding matrix, and a column vector of the ideal precoding matrix may be used as the ideal precoding vector. In addition, the foregoing ideal precoding matrix obtained through singular value decomposition may alternatively be obtained by, for example without limitation to, performing eigenvalue decomposition on a correlation matrix of the channel matrix. In a specific implementation process, a specific value of the ideal precoding vector and a method for obtaining the specific value of the ideal precoding vector may be determined based on an overall requirement of a system design. Technical details about the ideal precoding vector have been clearly described in the prior art, and therefore are not described herein.

After the foregoing ideal precoding vector is obtained, the ideal precoding vector may be approximately represented in a form of a weighted sum of the plurality of component vectors:

$$P \approx \sum_{i=1}^{m} a_i b_i.$$

P represents an ideal precoding vector, $b_i$ represents a component vector i, and $a_i$ represents a weight of the component vector i. In a specific implementation process, a quantity m (m is a positive integer) of component vectors may be set based on a specific requirement (for example without limitation to an accuracy requirement). For example, the quantity of component vectors may be a preset quantity.

A component vector is selected from a basic codebook. The basic codebook may be usually represented in a form of a matrix, and therefore, the basic codebook may also be referred to as a basic codebook matrix. For the basic codebook mentioned in this specification, unless otherwise specified, or if the basic codebook does not conflict with an actual function or internal logic of the basic codebook in the related description, the basic codebook and the basic codebook matrix can be interchanged.

The basic codebook matrix includes a plurality of column vectors, and some of these column vectors may be selected as component vectors. There are many methods for selecting a component vector, and a proper method may be selected based on a specific requirement. For example, a component vector may be determined from a plurality of column vectors based on a degree at which a column vector of the basic codebook matrix approximates to the ideal precoding vector, where a plurality of column vectors that most approximate to the ideal precoding vector may be selected as component vectors. In a specific implementation process, the foregoing approximate degree may be specifically expressed as, for example without limitation to, an inner product of the column vector of the basic codebook matrix and the ideal precoding vector or a Euclidean distance between the column vector of the basic codebook matrix and the ideal precoding vector. The inner product is used as an example. When a component vector is determined, a plurality of column vectors may be used as component vectors if inner products of the plurality of column vectors and the ideal precoding vector are greatest. When there are a plurality of basic codebook matrices, the foregoing plurality of column vectors may belong to different basic codebooks. In addition, an inner product of each component vector and the ideal precoding vector may be further used as a weight of the component vector. A method for determining a component vector and a weight of the component vector has been clearly described in the prior art. Details are not described in this specification.

To more accurately describe a channel environment, this embodiment of the present invention provides a plurality of basic codebooks, and the following describes these basic codebooks in detail.

The basic codebook is usually associated with an antenna array. For example, it may be understood that many parameters in a basic codebook expression may be used to represent different properties of an antenna array. Therefore, to facilitate understanding of the basic codebook provided in this embodiment of the present invention, the following describes the basic codebook with reference to an antenna array. However, a person skilled in the art should understand that the basic codebook provided in this embodiment of the present invention is not limited to a specific antenna array. In a specific implementation process, a proper antenna array may be selected based on a specific requirement, and various parameters in the basic codebook provided in this embodiment of the present invention are set based on the selected antenna array, so that a precoding vector is determined by using the basic codebook provided in this embodiment of the present invention.

FIG. 3 is an example schematic diagram of an antenna array 300 according to an embodiment of the present invention. As shown in FIG. 3, the antenna array 300 includes a plurality of array element groups 302, and these array element groups 302 are arranged in a form of a matrix. Specifically, each row of the matrix includes a plurality of array element groups 302, and each column includes a plurality of array element groups 302. Each array element group 302 includes two array elements: an array element 304 that works in a first polarization direction and an array element 306 that works in a second polarization direction.

In the description of this specification, ⊗ represents a Kronecker product.

A first basic codebook B provided in this embodiment of the present invention may be represented in the following form:

$$B = \begin{bmatrix} G & G \\ G\psi & -G\psi \end{bmatrix}.$$

$$G = (D_{N_1,O_1}) \otimes (D_{N_2,O_2}).$$

A matrix $D_{N_1,O_1}$ and a matrix $D_{N_2,O_2}$ may be referred to as two-dimensional discrete Fourier transform (DFT) matrices that are obtained after over-sampling, and a value of an element $d(m_1,n_1)$ in $D_{N_1,O_1}$ may be:

$$d(m_1, n_1) = e^{j\frac{2\pi}{O_1 N_1}m_1 n_1} \text{ or } d(m_1, n_1) = e^{-j\frac{2\pi}{O_1 N_1}m_1 n_1}.$$

$O_1$ and $N_1$ are preset values, both $O_1$ and $N_1$ are positive integers, $0 \le m_1 \le N_1-1$, and $0 \le n_1 \le O_1 N_1-1$. A value of an element $d(m_2,n_2)$ in $D_{N_2,O_2}$ may be:

$$d(m_2, n_2) = e^{j\frac{2\pi}{O_2 N_2}m_2 n_2} \text{ or } d(m_2, n_2) = e^{-j\frac{2\pi}{O_2 N_2}m_2 n_2}.$$

$O_2$ and $N_2$ are preset values, both $O_2$ and $N_2$ are positive integers, $0 \le m_2 \le N_2-1$, and $0 \le n_2 \le O_2 N_2-1$. $\psi$ is a diagonal matrix, and a value of an $i^{th}$ element $\Lambda_{ii}$ on a main diagonal of the diagonal matrix is:

$\Lambda_{ii} = e^{jx}$, where $1 \le i \le O_1 O_2 N_1 N_2$, x is a codebook parameter, the codebook parameter is a variable, and $0 \le x \le 2\pi$.

In a specific implementation process, functions of $O_1$ and $O_2$ may be understood as over-sampling. $N_1$ and $N_2$ may be used to represent a quantity of array element groups 302 in each row (or column) of array element groups 302 in the antenna array 300 and a quantity of array element groups 302 in each column (or row) of array element groups 302 in the antenna array 300. $\Lambda_{ii}$ may be used to set a polarization phase difference between array elements that work in different polarization directions in the array element groups 302. In a specific implementation process, a value of the codebook parameter x may be selected from a preset quantity of preset values in a group (for example, $$\left\{0, \frac{\pi}{2}, \frac{2\pi}{2}, \frac{3\pi}{2}\right\}\right).$$

It is not difficult to understand that, if the method 200 shown in FIG. 2 is performed based on the first basic codebook, during indication of the determined component vector, the value of the codebook parameter x and a component vector selected from the basic codebook that is determined based on the value of the codebook parameter x need to be indicated, where the component vector may be further indicated by using an index of the component vector. It should be noted that there may be at least one value of the indicated codebook parameter x, and therefore the selected component vector may be from at least one basic codebook. When there are a plurality of values of the indicated codebook parameter x, a correspondence between the component vector and the value of the codebook parameter x further needs to be indicated during indication of the determined component vector.

A second basic codebook B provided in this embodiment of the present invention may be represented in the following form:

$$B = \begin{bmatrix} G & G \\ G\psi & -G\psi \end{bmatrix}.$$

$$G = \left(L_{N_1}^{k_1} D_{N_1}\right) \otimes \left(L_{N_2}^{k_2} D_{N_2}\right).$$

A matrix $D_{N_1}$ and a matrix $D_{N_2}$ may be referred to as two-dimensional DFT matrices. A value of an element $d(m_1,n_1)$ in $D_{N_1}$ may be:

$$d(m_1, n_1) = e^{j\frac{2\pi}{N_1}m_1 n_1} \text{ or } d(m_1, n_1) = e^{-j\frac{2\pi}{N_1}m_1 n_1}.$$

$N_1$ is a preset value, $N_1$ is a positive integer, $0 \le m_1 \le N_1-1$, and $0 \le n_1 \le N_1-1$. A value of an element $d(m_2,n_2)$ in $D_{N_2}$ may be:

$$d(m_2, n_2) = e^{j\frac{2\pi}{N_2}m_2 n_2} \text{ or } d(m_2, n_2) = e^{-j\frac{2\pi}{N_2}m_2 n_2}.$$

$N_2$ is a preset value, $N_2$ is a positive integer, $0 \le m_2 \le N_2-1$, and $0 \le n_2 \le N_2-1$. $L_{N_1}^{k_1}$ is a diagonal matrix; and if $$d(m_1, n_1) = e^{j\frac{2\pi}{N_1}m_1 n_1},$$

the diagonal matrix $L_{N_1}^{k_1}$ may be expressed as:

$$L_{N_1}^{k_1} = \operatorname{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or if $$d(m_1, n_1) = e^{-j\frac{2\pi}{N_1}m_1 n_1},$$

the diagonal matrix $L_{N_1}^{k_1}$ may be expressed as:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

where $O_1$ is a preset value, $O_1$ is a positive integer, $k_1$ is a first codebook parameter, the first codebook parameter is a variable, $k_1$ is an integer, and $0 \leq k_1 \leq O_1-1$. $L_{N_2}^{k_2}$ is a diagonal matrix; and if $$d(m_2, n_2) = e^{-j\frac{2\pi}{N_2}m_2 n_2},$$

the diagonal matrix $L_{N_2}^{k_2}$ may be expressed as:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ may be expressed as:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

where $O_2$ is a preset value, $O_2$ is a positive integer, $k_2$ is a second codebook parameter, the second codebook parameter is a variable, $k_2$ is an integer, and $0 \leq k_2 \leq O_2-1$. $\psi$ is a diagonal matrix, and a value of an $i^{th}$ element $\Lambda_{ii}$ on a main diagonal of the diagonal matrix is:

$\Lambda_{ii} = e^{jx}$, where $1 \leq i \leq O_1 O_2 N_1 N_2$, x is a third codebook parameter, the third codebook parameter is a variable, and $0 \leq x \leq 2\pi$.

In a specific implementation process, functions of $O_1$ and $O_2$ may be understood as over-sampling. The first codebook parameter $k_1$ and the second codebook parameter $k_2$ may be used to set column vectors in the generated basic codebook B orthogonal to each other. $N_1$ and $N_2$ may be used to represent a quantity of array element groups 302 in each row (or column) of array element groups 302 in the antenna array 300 and a quantity of array element groups 302 in each column (or row) of array element groups 302 in the antenna array 300. $\Lambda_{ii}$ may be used to set a polarization phase difference between array elements that work in different polarization directions in the array element groups 302. In a specific implementation process, a value of the codebook parameter x may be selected from a preset quantity of preset values in a group (for example, $$\left\{0, \frac{\pi}{2}, \frac{2\pi}{2}, \frac{3\pi}{2}\right\}\right).$$

It is not difficult to understand that, if the method 200 shown in FIG. 2 is performed based on the second basic codebook, during indication of the determined component vector, a codebook parameter group and a component vector selected from a basic codebook that is determined based on the codebook parameter group need to be indicated, where each codebook parameter group includes a value of the first codebook parameter $k_1$, a value of the second codebook parameter $k_2$, and a value of the third codebook parameter x, and the component vector may be further indicated by using an index of the component vector. It should be noted that there may be at least one indicated codebook parameter group, and therefore the selected component vector may be from at least one basic codebook. When there are a plurality of indicated codebook parameter groups, a correspondence between the component vector and the codebook parameter group further needs to be indicated during indication of the determined component vector.

A third basic codebook B provided in this embodiment of the present invention may be represented in the following form:

$$B = \begin{bmatrix} (L_{N_1}^{k_1} D_{N_1}) \otimes (L_{N_2}^{k_2} D_{N_2}) & (L_{N_1}^{k_1} D_{N_1}) \otimes (L_{N_2}^{k_2} D_{N_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix}.$$

A matrix $D_{N_1}$ and a matrix $D_{N_2}$ may be referred to as two-dimensional DFT matrices. A value of an element $d(m_1, n_1)$ in $D_{N_1}$ may be:

$$d(m_1, n_1) = e^{j\frac{2\pi}{N_1}m_1 n_1} \text{ or } d(m_1, n_1) = e^{-j\frac{2\pi}{N_1}m_1 n_1}.$$

$N_1$ is a preset value, $N_1$ is a positive integer, $0 \leq m \leq N-1$, and $0 \leq n_1 \leq N_1-1$. A value of an element $d(m_2, n_2)$ in $D_{N_2}$ may be:

$$d(m_2, n_2) = e^{j\frac{2\pi}{N_1}m_2 n_2} \text{ or } d(m_1, n_1) = e^{-j\frac{2\pi}{N_2}m_2 n_2}.$$

$N_2$ is a preset value, $N_2$ is a positive integer, $0 \leq m_2 \leq N_2-1$, and $0 \leq n_2 \leq N_2-1$. $L_{N_1}^{k_1}$ is a diagonal matrix; and if $$d(m_1, n_1) = e^{j\frac{2\pi}{N_1}m_1 n_1},$$

the diagonal matrix $L_{N_1}^{k_1}$ may be expressed as:

$$L_{N_1}^{k_1} = \text{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ may be expressed as:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

where $O_1$ is a preset value, $O_1$ is a positive integer, $k_1$ is a first codebook parameter, the first codebook parameter is a variable, $k_1$ is an integer, and $0 \leq k_1 \leq O_1 - 1$. $L_{N_2}^{k_2}$ is a diagonal matrix; and if $$d(m_2, n_2) = e^{j\frac{2\pi}{N_2} m_2 n_2},$$

the diagonal matrix $L_{N_2}^{k_2}$ may be expressed as:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2} m_2 n_2},$$

the diagonal matrix $L_{N_1}^{k_1}$ may be expressed as:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

where $O_2$ is a preset value, $O_2$ is a positive integer, $k_2$ is a second codebook parameter, the second codebook parameter is a variable, $k_2$ is an integer, and $0 \leq k_2 \leq O_2 - 1$. $R_{N_1}^{q_1}$ is a diagonal matrix; and if $$d(m_1, n_1) = e^{j\frac{2\pi}{N_1} m_1 n_1},$$

the diagonal matrix $R_{N_1}^{q_1}$ may be expressed as:

$$R_{N_1}^{q_1} = \text{diag}\left(\left[e^{j\frac{2\pi q_1}{Q_1 N_1} 0}, e^{j\frac{2\pi q_1}{Q_1 N_1} 1}, \ldots, e^{j\frac{2\pi q_1}{Q_1 N_1}(N_1-1)}\right]\right),$$

or
if $$d(m_1, n_1) = e^{-j\frac{2\pi}{N_1} m_1 n_1},$$

the diagonal matrix $R_{N_1}^{q_1}$ may be expressed as:

$$R_{N_1}^{q_1} = \text{diag}\left(\left[e^{-j\frac{2\pi q_1}{Q_1 N_1} 0}, e^{-j\frac{2\pi q_1}{Q_1 N_1} 1}, \ldots, e^{-j\frac{2\pi q_1}{Q_1 N_1}(N_1-1)}\right]\right),$$

where $Q_1$ is a preset value, $Q_1$ is a positive integer, $q_1$ is a third codebook parameter, the third codebook parameter is a variable, $q_1$ is an integer, and $-(Q_1-1) \leq q_1 \leq (Q_1-1)$. $R_{N_2}^{q_2}$ is a diagonal matrix; and if $$d(m_2, n_2) = e^{j\frac{2\pi}{N_2} m_2 n_2},$$

the diagonal matrix $R_{N_2}^{q_2}$ may be expressed as:

$$R_{N_2}^{q_2} = \text{diag}\left(\left[e^{j\frac{2\pi q_2}{Q_2 N_2} 0}, e^{j\frac{2\pi q_2}{Q_2 N_2} 1}, \ldots, e^{j\frac{2\pi q_2}{Q_2 N_2}(N_2-1)}\right]\right),$$

or
if $$d(m_2, n_2) = e^{-j\frac{2\pi}{N_2} m_2 n_2},$$

the diagonal matrix $R_{N_2}^{q_2}$ may be expressed as:

$$R_{N_2}^{q_2} = \text{diag}\left(\left[e^{-j\frac{2\pi q_2}{Q_2 N_2} 0}, e^{-j\frac{2\pi q_2}{Q_2 N_2} 1}, \ldots, e^{-j\frac{2\pi q_2}{Q_2 N_2}(N_2-1)}\right]\right),$$

where $Q_2$ is a preset value, $Q_2$ is a positive integer, $q_2$ is a fourth codebook parameter, the fourth codebook parameter is a variable, $q_2$ is an integer, and $-(Q_2-1) \leq q_2 \leq (Q_2-1)$.

In a specific implementation process, functions of $O_1$ and $O_2$ may be understood as over-sampling. The first codebook parameter $k_1$ and the second codebook parameter $k_2$ may be used to set column vectors in the generated basic codebook B orthogonal to each other. $N_1$ and $N_2$ may be used to represent a quantity of array element groups 302 in each row (or column) of array element groups 302 in the antenna array 300 and a quantity of array element groups 302 in each column (or row) of array element groups 302 in the antenna array 300. $Q_1$, $Q_2$, the third codebook parameter $q_1$, and the fourth codebook parameter $q_2$ may be used to set a polarization phase of an array element in the array element group 302.

It is not difficult to understand that, if the method 200 shown in FIG. 2 is performed based on the third basic codebook, during indication of the determined component vector, a codebook parameter group and a component vector selected from a basic codebook that is determined based on the codebook parameter group need to be indicated, where each codebook parameter group includes a value of the first codebook parameter $k_1$, a value of the second codebook parameter $k_2$, a value of the third codebook parameter $q_1$, and a value of the fourth codebook parameter $q_2$, and the component vector may be further indicated by using an index of the component vector. It should be noted that there may be at least one indicated codebook parameter group, and therefore the selected component vector may be from at least one basic codebook. When there are a plurality of indicated codebook parameter groups, a correspondence between the component vector and the codebook parameter group further needs to be indicated during indication of the determined component vector.

A fourth basic codebook B provided in this embodiment of the present invention may be represented in the following form:

$$B = \begin{bmatrix} (L_{N_1}^{k_1} D_{N_1} R_{N_1}^{p_1}) \otimes (L_{N_2}^{k_2} D_{N_2} R_{N_2}^{p_2}) & (L_{N_1}^{k_1} D_{N_1} R_{N_1}^{p_1}) \otimes (L_{N_2}^{k_2} D_{N_2} R_{N_2}^{p_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix}.$$

A matrix $D_{N_1}$ and a matrix $D_{N_2}$ may be referred to as two-dimensional DFT matrices. A value of an element $d(m_1, n_1)$ in $D_{N_1}$ may be:

$$d(m_1, n_1) = e^{j\frac{2\pi}{N_1} m_1 n_1} \text{ or } d(m_1, n_1) = e^{-j\frac{2\pi}{N_1} m_1 n_1}.$$

$N_1$ is a preset value, $N_1$ is a positive integer, $0 \leq m_1 \leq N_1 - 1$, and $0 \leq n_1 \leq N_1 - 1$. A value of an element $d(m_2, n_2)$ in $D_{N_2}$ may be:

$$d(m_2, n_2) = e^{j\frac{2\pi}{N_2} m_2 n_2} \text{ or } d(m_2, n_2) = e^{-j\frac{2\pi}{N_2} m_2 n_2}.$$

$N_2$ is a preset value, $N_2$ is a positive integer, $0 \leq m_2 \leq N_2 - 1$, and $0 \leq n_2 \leq N_2 - 1$. $L_{N_1}^{k_1}$ is a diagonal matrix; and if $$d(m_1, n_1) = e^{j\frac{2\pi}{N_1} m_1 n_1},$$

the diagonal matrix $L_{N_1}^{k_1}$ may be expressed as:

$$L_{N_1}^{k_1} = \text{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$$

or
if $$d(m_1, n_1) = e^{-j\frac{2\pi}{N_1} m_1 n_1},$$

the diagonal matrix $L_{N_1}^{k_1}$ may be expressed as:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

where
$O_1$ is a preset value, $O_1$ is a positive integer, $k_1$ is a first codebook parameter, the first codebook parameter is a variable, $k_1$ is an integer, and $0 \leq k_1 \leq O_1 - 1$. $L_{N_2}^{k_2}$ is a diagonal matrix; and if $$d(m_2, n_2) = e^{j\frac{2\pi}{N_2} m_2 n_2},$$

the diagonal matrix $L_{N_2}^{k_2}$ may be expressed as:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2} m_2 n_2},$$

the diagonal matrix $L_{N_2}^{k_2}$ may be expressed as:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

where
$O_2$ is a preset value, $O_2$ is a positive integer, $k_2$ is a second codebook parameter, the second codebook parameter is a variable, $k_2$ is an integer, and $0 \leq k_2 \leq O_2 - 1$. $R_{N_1}^{p_1}$ is a diagonal matrix; and if $$d(m_1, n_1) = e^{j\frac{2\pi}{N_1} m_1 n_1},$$

the diagonal matrix $R_{N_1}^{p_1}$ may be expressed as:

$$R_{N_1}^{p_1} = \text{diag}\left(\left[e^{j\frac{2\pi p_1}{Q_1 N_1} 0}, e^{j\frac{2\pi p_1}{Q_1 N_1} 1}, \ldots, e^{j\frac{2\pi p_1}{Q_1 N_1}(N_1-1)}\right]\right),$$

or
if $$d(m_1, n_1) = e^{-j\frac{2\pi}{N_1} m_1 n_1},$$

the diagonal matrix $R_{N_1}^{p_1}$ may be expressed as:

$$R_{N_1}^{p_1} = \text{diag}\left(\left[e^{-j\frac{2\pi p_1}{Q_1 N_1} 0}, e^{-j\frac{2\pi p_1}{Q_1 N_1} 1}, \ldots, e^{-j\frac{2\pi p_1}{Q_1 N_1}(N_1-1)}\right]\right),$$

where
$Q_1$ is a preset value, $Q_1$ is a positive integer, $p_1$ is a third codebook parameter, the third codebook parameter is a variable, $p_1$ is an integer, and $0 \leq p_1 \leq (Q_1 - 1)$. $R_{N_2}^{p_2}$ is a diagonal matrix; and if $$d(m_2, n_2) = e^{j\frac{2\pi}{N_2} m_2 n_2},$$

the diagonal matrix $R_{N_2}^{p_2}$ may be expressed as:

$$R_{N_2}^{p_2} = \text{diag}\left(\left[e^{j\frac{2\pi p_2}{Q_2 N_2} 0}, e^{j\frac{2\pi p_2}{Q_2 N_2} 1}, \ldots, e^{j\frac{2\pi p_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{p_2}$ may be expressed as:

$$R_{N_2}^{p_2} = \text{diag}\left(\left[e^{-j\frac{2\pi p_2}{Q_2 N_2}0}, e^{-j\frac{2\pi p_2}{Q_2 N_2}1}, \ldots, e^{-j\frac{2\pi p_2}{Q_2 N_2}(N_2-1)}\right]\right),$$

where $Q_2$ is a preset value, $Q_2$ is a positive integer, $p_2$ is a fourth codebook parameter, the fourth codebook parameter is a variable, $p_2$ is an integer, and $0 \le p_2 \le (Q_2-1)$. $R_{N_1}^{q_1}$ is a diagonal matrix; and if $$d(m_1, n_1) = e^{j\frac{2\pi}{N_1}m_1 n_1},$$

the diagonal matrix $R_{N_1}^{q_1}$ may be expressed as:

$$R_{N_1}^{q_1} = \text{diag}\left(\left[e^{j\frac{2\pi q_1}{Q_3 N_1}0}, e^{j\frac{2\pi q_1}{Q_3 N_1}1}, \ldots, e^{j\frac{2\pi q_1}{Q_3 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ may be expressed as:

$$R_{N_1}^{q_1} = \text{diag}\left(\left[e^{-j\frac{2\pi q_1}{Q_3 N_1}0}, e^{-j\frac{2\pi q_1}{Q_3 N_1}1}, \ldots, e^{-j\frac{2\pi q_1}{Q_3 N_1}(N_1-1)}\right]\right),$$

where $Q_3$ is a preset value, $Q_3$ is a positive integer, $q_1$ is a fifth codebook parameter, the fifth codebook parameter is a variable, $q_1$ is an integer, and $0 \le q_1 \le (Q_3-1)$. $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ may be expressed as:

$$R_{N_2}^{q_2} = \text{diag}\left(\left[e^{j\frac{2\pi q_2}{Q_4 N_2}0}, e^{j\frac{2\pi q_2}{Q_4 N_2}1}, \ldots, e^{j\frac{2\pi q_2}{Q_4 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ may be expressed as:

$$R_{N_2}^{q_2} = \text{diag}\left(\left[e^{-j\frac{2\pi q_2}{Q_4 N_2}0}, e^{-j\frac{2\pi q_2}{Q_4 N_2}1}, \ldots, e^{-j\frac{2\pi q_2}{Q_4 N_2}(N_2-1)}\right]\right),$$

where $Q_4$ is a preset value, $Q_4$ is a positive integer, $q_2$ is a sixth codebook parameter, the sixth codebook parameter is a variable, $q_2$ is an integer, and $0 \le q_2 \le (Q_4-1)$.

In a specific implementation process, functions of $O_1$ and $O_2$ may be understood as over-sampling. The first codebook parameter $k_1$ and the second codebook parameter $k_2$ may be used to set column vectors in the generated basic codebook B orthogonal to each other. $N_1$ and $N_2$ may be used to represent a quantity of array element groups 302 in each row (or column) of array element groups 302 in the antenna array 300 and a quantity of array element groups 302 in each column (or row) of array element groups 302 in the antenna array 300. $Q_1$, $Q_2$, $Q_3$, $Q_4$, the third codebook parameter $p_1$, the fourth codebook parameter $p_2$, the fifth codebook parameter $q_1$, and the sixth codebook parameter $q_2$ may be used to set a polarization phase of an array element in the array element group 302.

It is not difficult to understand that, if the method 200 shown in FIG. 2 is performed based on the fourth basic codebook, during indication of the determined component vector, a codebook parameter vector and a component vector selected from a basic codebook that is determined based on the codebook parameter group need to be indicated, where each codebook parameter group includes a value of the first codebook parameter $k_1$, a value of the second codebook parameter $k_2$, a value of the third codebook parameter $p_1$, a value of the fourth codebook parameter $p_2$, a value of the fifth codebook parameter $q_1$, and a value of the sixth codebook parameter $q_2$, and the component vector may be further indicated by using an index of the component vector. It should be noted that there may be at least one indicated codebook parameter group, and therefore the selected component vector may be from at least one basic codebook. When there are a plurality of indicated codebook parameter groups, a correspondence between the component vector and the codebook parameter group further needs to be indicated during indication of the determined component vector.

A fifth basic codebook B provided in this embodiment of the present invention may be represented in the following form:

$$B = \begin{bmatrix} \left(L_{N_1}^{k_1} D_{N_1} R_{N_1}^{q_1}\right) \otimes \left(L_{N_2}^{k_2} D_{N_2} R_{N_2}^{q_2}\right) & \left(L_{N_1}^{k_1} D_{N_1} R_{N_1}^{q_1}\right) \otimes \left(L_{N_2}^{k_2} D_{N_2} R_{N_2}^{q_2}\right) \\ \left(L_{N_1}^{k_1} D_{N_1}\right) \otimes \left(L_{N_2}^{k_2} D_{N_2}\right) & -\left(L_{N_1}^{k_1} D_{N_1}\right) \otimes \left(L_{N_2}^{k_2} D_{N_2}\right) \end{bmatrix}.$$

A matrix $D_{N_1}$ and a matrix $D_{N_2}$ may be referred to as two-dimensional DFT matrices. A value of an element $d(m_1, n_1)$ in $D_{N_1}$ may be:

$$d(m_1, n_1) = e^{j\frac{2\pi}{N_1}m_1 n_1} \text{ or } d(m_1, n_1) = e^{-j\frac{2\pi}{N_1}m_1 n_1}.$$

$N_1$ is a preset value, $N_1$ is a positive integer, $0 \leq m_1 \leq N_1-1$, and $0 \leq n_1 \leq N_1-1$. A value of an element $d(m_2,n_2)$ in $D_{N_2}$ may be:

$$d(m_2, n_2) = e^{j\frac{2\pi}{N_2}m_2 n_2} \text{ or } d(m_2, n_2) = e^{-j\frac{2\pi}{N_2}m_2 n_2}.$$

$N_2$ is a preset value, $N_2$ is a positive integer, $0 \leq m_2 \leq N_2-1$, and $0 \leq n_2 \leq N_2-1$. $L_{N_1}^{k_1}$ is a diagonal matrix; and if $$d(m_1, n_1) = e^{j\frac{2\pi}{N_1}m_1 n_1},$$

the diagonal matrix $L_{N_1}^{k_1}$ may be expressed as:

$$L_{N_1}^{k_1} = \text{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ may be expressed as:

$$L_{N_1}^{k_1} = \text{diag}\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

where $O_1$ is a preset value, $O_1$ is a positive integer, $k_1$ is a first codebook parameter, the first codebook parameter is a variable, $k_1$ is an integer, and $0 \leq k \leq O_1-1$. $L_{N_2}^{k_2}$ is a diagonal matrix; and if $$d(m_2, n_2) = e^{j\frac{2\pi}{N_2}m_2 n_2},$$

the diagonal matrix $L_{N_2}^{k_2}$ may be expressed as:

$$L_{N_2}^{k_2} = \text{diag}\left(\left[e^{j\frac{2\pi k_2}{O_2 N_2}0}, e^{j\frac{2\pi k_2}{O_2 N_2}1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ may be expressed as:

$$L_{N_2}^{k_2} = \text{diag}\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

where $O_2$ is a preset value, $O_2$ is a positive integer, $k_2$ is a second codebook parameter, the second codebook parameter is a variable, $k_2$ is an integer, and $0 \leq k_2 \leq O_2-1$. $R_{N_1}^{q_1}$ is a diagonal matrix; and if $$d(m_1, n_1) = e^{j\frac{2\pi}{N_1}m_1 n_1},$$

the diagonal matrix $R_{N_1}^{q_1}$ may be expressed as:

$$R_{N_1}^{q_1} = \text{diag}\left(\left[e^{j\frac{2\pi q_1}{Q_1 N_1}0}, e^{j\frac{2\pi q_1}{Q_1 N_1}1}, \ldots, e^{j\frac{2\pi q_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ may be expressed as:

$$R_{N_1}^{q_1} = \text{diag}\left(\left[e^{-j\frac{2\pi q_1}{Q_1 N_1}0}, e^{-j\frac{2\pi q_1}{Q_1 N_1}1}, \ldots, e^{-j\frac{2\pi q_1}{Q_1 N_1}(N_1-1)}\right]\right),$$

where $Q_1$ is a preset value, $Q_1$ is a positive integer, $q_1$ is a third codebook parameter, the third codebook parameter is a variable, $q_1$ is an integer, and $-(Q_1-1) \leq q_1 \leq (Q_1-1)$. $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ may be expressed as:

$$R_{N_2}^{q_2} = \text{diag}\left(\left[e^{j\frac{2\pi q_2}{Q_2 N_2}0}, e^{j\frac{2\pi q_2}{Q_2 N_2}1}, \ldots, e^{j\frac{2\pi q_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ may be expressed as:

$$R_{N_2}^{q_2} = \text{diag}\left(\left[e^{-j\frac{2\pi q_2}{Q_2 N_2}0}, e^{-j\frac{2\pi q_2}{Q_2 N_2}1}, \ldots, e^{-j\frac{2\pi q_2}{Q_2 N_2}(N_2-1)}\right]\right),$$

where $Q_2$ is a preset value, $Q_2$ is a positive integer, $q_2$ is a fourth codebook parameter, the fourth codebook parameter is a variable, $q_2$ is an integer, and $-(Q_2-1) \leq q_2 \leq (Q_2-1)$.

In a specific implementation process, functions of $O_1$ and $O_2$ may be understood as over-sampling. The first codebook parameter $k_1$ and the second codebook parameter $k_2$ may be used to set column vectors in the generated basic codebook B orthogonal to each other. $N_1$ and $N_2$ may be used to represent a quantity of array element groups 302 in each row (or column) of array element groups 302 in the antenna array 300 and a quantity of array element groups 302 in each column (or row) of array element groups 302 in the antenna array 300. $Q_1$, $Q_2$, the third codebook parameter $q_1$, and the fourth codebook parameter $q_2$ may be used to set a polarization phase of an array element in the array element group 302.

It is not difficult to understand that, if the method 200 shown in FIG. 2 is performed based on the fifth basic codebook, during indication of the determined component vector, a codebook parameter group and a component vector selected from a basic codebook that is determined based on the codebook parameter group need to be indicated, where each codebook parameter group includes a value of the first codebook parameter $k_1$, a value of the second codebook parameter $k_2$, a value of the third codebook parameter $q_1$, and a value of the fourth codebook parameter $q_2$, and the component vector may be further indicated by using an index of the component vector. It should be noted that there may be at least one indicated codebook parameter group, and therefore the selected component vector may be from at least one basic codebook. When there are a plurality of indicated codebook parameter groups, a correspondence between the component vector and the codebook parameter group further needs to be indicated during indication of the determined component vector.

It should be noted that in a specific implementation process, if a codebook parameter or a codebook parameter group needs to be indicated, the codebook parameter or the codebook parameter group may be indicated by using an index of the codebook parameter or an index of the codebook parameter group. In addition, in a specific implementation process, a transmit end device and the receive end device may determine a codebook parameter or a codebook parameter group through negotiation in advance. Alternatively, either of the transmit end device and the receive end device may further indicate a codebook parameter or a codebook parameter group to a peer device. Alternatively, a codebook parameter or a codebook parameter group may be preset when a communications system is designed. In this way, the receive end device may determine, in advance, a basic codebook used to determine a component vector and a weight of the component vector. In this case, when determined component vectors are from one basic codebook, during indication of the component vectors and weights of the component vectors, the receive end device may not need to indicate a codebook parameter or a codebook parameter group. Even if determined component vectors are from a plurality of basic codebooks, during indication of the component vectors and weights of the component vectors, the receive end device may explicitly or implicitly indicate a codebook parameter or a codebook parameter group by using an index of the codebook parameter or an index of the codebook parameter group or based on a preset order of the component vectors. It can be learned that, when a component vector and a weight of the component vector are indicated, a codebook parameter or a codebook parameter group are not necessarily indicated. It is not difficult to understand that, to reduce processing and feedback overheads, in a specific implementation process, all component vectors and weights of these component vectors may be determined based on only one basic codebook. The component vector may be indicated by using the index of the component vector. In addition, the component vector may be further indicated in a plurality of other manners. For example without limitation, the component vector may be directly indicated.

In addition, in a specific implementation process, to reduce overheads generated by indicating the weight of the component vector, the weight may be quantized. In this case, the weight determined and indicated in the method 200 shown in FIG. 2 may be understood as a quantized value of the weight. Further, the quantized value may be represented in a form of a binary sequence or an index, and a length of the binary sequence or index may be set based on a specific requirement (for example, feedback overheads). In this way, the weight determined and indicated in the method 200 shown in FIG. 2 may be further understood as a binary sequence or an index corresponding to the quantized value of the weight. In addition, other processing may be performed on the weight, so as to reduce overheads caused by indicating the weight. In this case, the weight determined and indicated in the method 200 shown in FIG. 2 may be understood as the foregoing processed weight. Certainly, the weight may alternatively be directly indicated.

For each basic codebook described above, in a specific implementation process, a corresponding coefficient may be further set for at least one composition matrix (for example without limitation to a DFT matrix and a diagonal matrix) in at least one block matrix in the basic codebook, and a specific value of the coefficient may be set based on a requirement. In addition, in a specific implementation process, a proper coefficient may be further set for at least one block matrix in the basic codebook based on a specific requirement.

It should be noted that in a specific implementation process, a determining and indicating period of the component vector may be the same as or different from a determining and indicating period of the weight. For example, the determining and indicating period of the component vector may be longer or shorter than the determining and indicating period of the weight. In this case, it should be understood that operations of determining and indicating the component vector in the method 200 and operations of determining and indicating the weight in the method 200 may be completed within a same feedback period, or may be completed within different feedback periods. In addition, the component vector and the weight of the component vector may be determined and indicated based on a wideband (for example, may be of an entire system bandwidth, of 20 M, or of 10 M), or may be determined and indicated based on a narrowband (for example, may be a subband within an entire system bandwidth, or may be of 2 M or 1 M). Actually, in the prior art, a codebook may be represented in the following form:

$$W = W_1 W_2.$$

$W_1$ may be referred to as a long-term/wideband codebook, and $W_2$ may be referred to as a short-term/narrowband codebook. In the technical solution provided in this embodiment of the present invention, for manners of determining and indicating the component vector, refer to manners of determining and indicating $W_1$ in the prior art, and for manners of determining and indicating the weight, refer to manners of determining and indicating $W_2$ in the prior art. It should be understood that these manners of determining and indicating are also included in the method 200.

In the technical solution provided in this embodiment of the present invention, a basic codebook is constructed based on a plurality of parameters, so that the basic codebook can be used to more accurately describe a channel environment.

In this way, a precoding vector determined based on the basic codebook provided in this embodiment of the present invention can more accurately match a channel, thereby improving a precoding effect.

It should be noted that in some cases, an ideal precoding vector that is approximately represented by a weighted sum of a plurality of component vectors may need to be reconstructed before being used for precoding. For example, in an MU-MIMO scenario, the transmit end device needs to perform a reconstruction operation based on the foregoing ideal precoding vector approximately represented by a plurality of receive end devices that are simultaneously scheduled, to obtain a precoding vector that is truly used for precoding for each receive end device. A purpose of the reconstruction may be, for example without limitation to, setting precoding vectors of different receive end devices orthogonal to each other, so as to reduce interference caused by a signal sent to one receive end device to another receive end device. The reconstruction process may be performed according to a plurality of algorithms, for example without limitation to, a zero forcing (ZF) algorithm, a minimum mean square error (MMSE) algorithm, and a block diagonalization (BD) algorithm.

Figure 4:
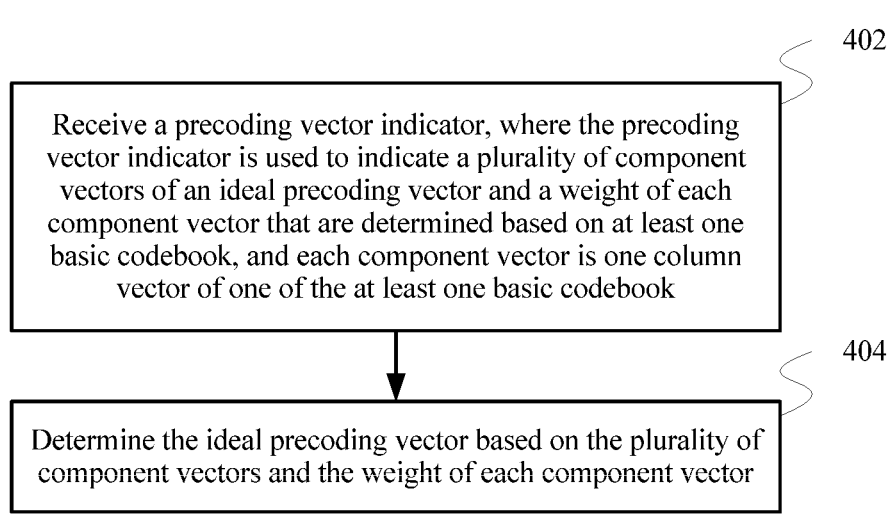
FIG. 4 is an example flowchart of a precoding vector determining method according to an embodiment of the present invention.

FIG. 4 is an example flowchart of a precoding vector determining method 400 according to an embodiment of the present invention. In a specific implementation process, the method 400 may be performed by, for example without limitation to, a transmit end device.

In operation 402, a precoding vector indicator is received, where the precoding vector indicator is used to indicate a plurality of component vectors of an ideal precoding vector and a weight of each component vector that are determined based on at least one basic codebook, and where each component vector is a column vector of one of the at least one basic codebook.

In operation 404, the ideal precoding vector is determined based on the plurality of component vectors and the weight of each component vector.

In a specific implementation process, the ideal precoding vector may be determined by performing weighted summation on the plurality of component vectors based on the respective weights of these component vectors.

Specific technical content in the method 400 has been clearly described above with reference to the method 200 and the antenna array 300. Therefore, details are not described herein again.

Figure 5:
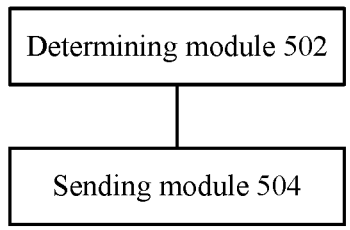
FIG. 5 is an example schematic diagram of a logical structure of a receive end device according to an embodiment of the present invention.

FIG. 5 is an example schematic diagram of a logical structure of a receive end device 500 according to an embodiment of the present invention. As shown in FIG. 5, the receive end device 500 includes a determining module 502 and a sending module 504.

The determining module 502 is configured to determine a plurality of component vectors of an ideal precoding vector and a weight of each component vector based on at least one basic codebook, where each component vector is a column vector of one of the at least one basic codebook.

The sending module 504 is configured to send a precoding vector indicator, where the precoding vector indicator is used to indicate the plurality of component vectors and the weight of each component vector.

The receive end device 500 is used to perform the foregoing method 200. Related technical content has been clearly described above with reference to the method 200 and the antenna array 300. Therefore, details are not described herein again.

Figure 6:
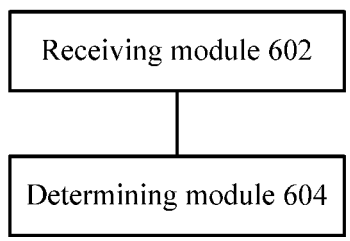
FIG. 6 is an example schematic diagram of a logical structure of a transmit end device according to an embodiment of the present invention.

FIG. 6 is an example schematic diagram of a logical structure of a transmit end device 600 according to an embodiment of the present invention. As shown in FIG. 6, the transmit end device 600 includes a receiving module 602 and a determining module 604.

The receiving module 602 is configured to receive a precoding vector indicator, where the precoding vector indicator is used to indicate a plurality of component vectors of an ideal precoding vector and a weight of each component vector that are determined based on at least one basic codebook, and each component vector is a column vector of one of the at least one basic codebook.

The determining module 604 is configured to determine the ideal precoding vector based on the plurality of component vectors and the weight of each component vector.

In a specific implementation process, the determining module 604 may determine the ideal precoding vector by performing weighted summation on the plurality of component vectors based on the respective weights of these component vectors.

The transmit end device 600 is used to perform the method 400. Related technical content has been clearly described above with reference to the method 200, the antenna array 300, and the method 400. Therefore, details are not described herein again.

Figure 7:
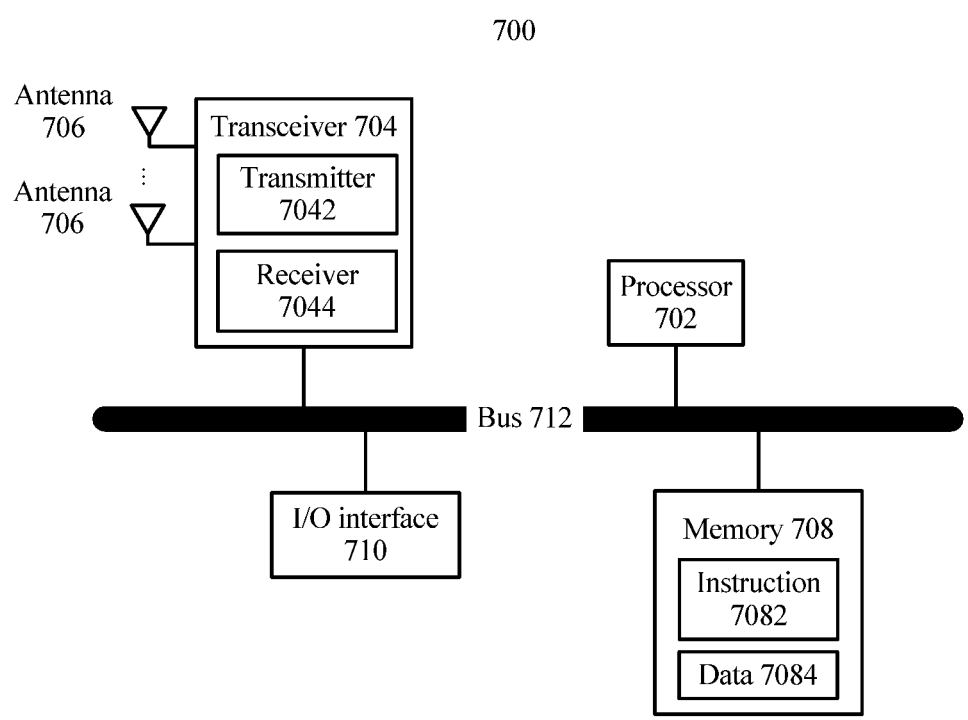
FIG. 7 is an example schematic diagram of a hardware structure of a receive end device according to an embodiment of the present invention.

FIG. 7 is an example schematic diagram of a hardware structure of a receive end device 700 according to an embodiment of the present invention. As shown in FIG. 7, the communications device 700 includes a processor 702, a transceiver 704, a plurality of antennas 706, a memory 708, an I/O (Input/Output) interface 710, and a bus 712. The transceiver 704 further includes a transmitter 7042 and a receiver 7044. The memory 708 is further configured to store an instruction 7082 and data 7084. In addition, the processor 702, the transceiver 704, the memory 708, and the I/O interface 710 communicate with and are connected to each other by using the bus 712, and the plurality of antennas 706 are connected to the transceiver 704.

The processor 702 may be a general purpose processor, for example without limitation to, a central processing unit (CPU), or may be a dedicated processor, for example without limitation to, a digital signal processor (DSP), an application-specific integrated circuit (ASIC), or a field programmable gate array (FPGA). In addition, the processor 702 may alternatively be a combination of a plurality of processors. Specially, in the technical solution provided in this embodiment of the present invention, the processor 702 may be configured to perform, for example, operation 202 in the method 200 shown in FIG. 2 and the operation performed by the determining module 502 of the receive end device 500 shown in FIG. 5. The processor 702 may be a processor that is specially designed to perform the foregoing steps and/or operations, or may be a processor that performs the foregoing steps and/or operations by reading and executing the instruction 7082 stored in the memory 708. The processor 702 may need to use the data 7084 in a process of performing the foregoing steps and/or operations.

The transceiver 704 includes the transmitter 7042 and the receiver 7044. The transmitter 7042 is configured to send a signal by using at least one of the plurality of antennas 706. The receiver 7044 is configured to receive a signal by using at least one of the plurality of antennas 706. Specially, in the technical solution provided in this embodiment of the present invention, by using at least one of the plurality of antennas 706, the transmitter 7042 may be specifically configured to perform, for example, operation 204 in the method 200 shown in FIG. 2 and the operation performed by the sending module 504 of the receive end device 500 shown in FIG. 5.

The memory 708 may be storage media of a plurality of types, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 708 is specifically configured to store the instruction 7082 and the data 7084. The processor 702 may perform the foregoing steps and/or operations by reading and executing the instruction 7082 stored in the memory 708, and may need to use the data 7084 in the process of performing the foregoing operations and/or steps.

The I/O interface 710 is configured to: receive an instruction and/or data from a peripheral device, and output an instruction and/or data to the peripheral device.

It should be noted that in a specific implementation process, the communications device 700 may further include other hardware components that are not enumerated in this specification.

Figure 8:
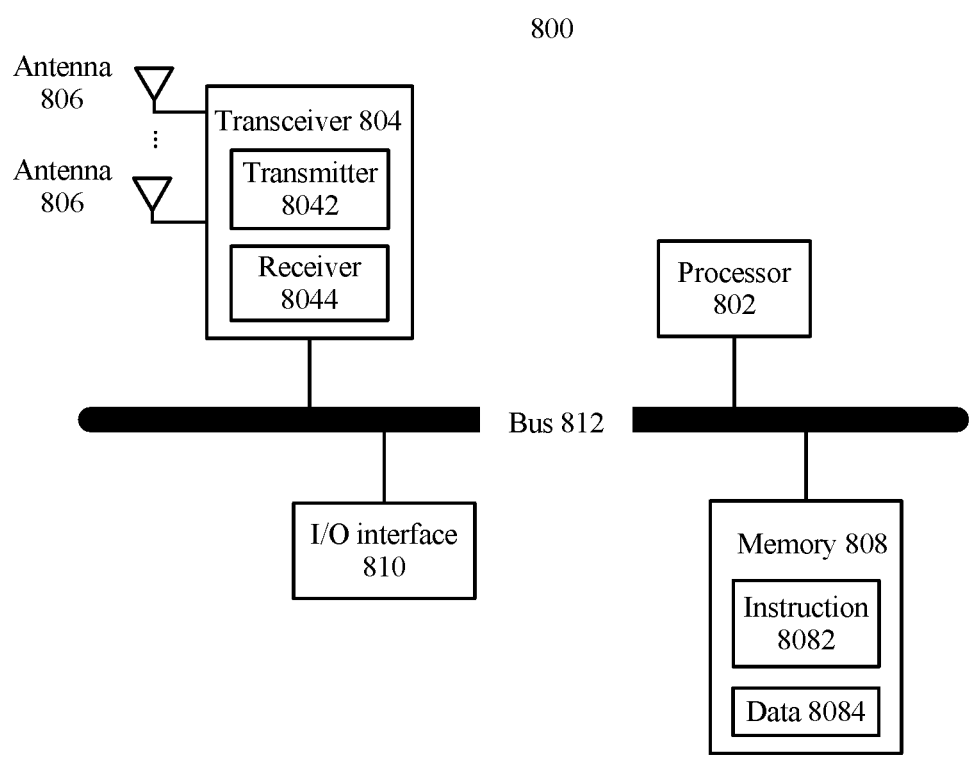
FIG. 8 is an example schematic diagram of a hardware structure of a transmit end device according to an embodiment of the present invention.

FIG. 8 is an example schematic diagram of a hardware structure of a transmit end device 800 according to an embodiment of the present invention. As shown in FIG. 8, the communications device 800 includes a processor 802, a transceiver 804, a plurality of antennas 806, a memory 808, an I/O (Input/Output) interface 810, and a bus 812. The transceiver 804 further includes a transmitter 8042 and a receiver 8044. The memory 808 is further configured to store an instruction 8082 and data 8084. In addition, the processor 802, the transceiver 804, the memory 808, and the I/O interface 810 communicate with and are connected to each other by using the bus 812, and the plurality of antennas 806 are connected to the transceiver 804.

The processor 802 may be a general purpose processor, for example without limitation to, a CPU, or may be a dedicated processor, for example without limitation to, a DSP, an ASIC, or a field FPGA. In addition, the processor 802 may alternatively be a combination of a plurality of processors. Specially, in the technical solution provided in this embodiment of the present invention, the processor 802 may be configured to perform, for example, operation 404 in the method 400 shown in FIG. 4 and the operation performed by the determining module 604 of the transmit end device 600 shown in FIG. 6. The processor 802 may be a processor that is specially designed to perform the foregoing steps and/or operations, or may be a processor that performs the foregoing steps and/or operations by reading and executing the instruction 8082 stored in the memory 808. The processor 802 may need to use the data 8084 in a process of performing the foregoing steps and/or operations.

The transceiver 804 includes the transmitter 8042 and the receiver 8044. The transmitter 8042 is configured to send a signal by using at least one of the plurality of antennas 806. The receiver 8044 is configured to receive a signal by using at least one of the plurality of antennas 806. Specially, in the technical solution provided in this embodiment of the present invention, by using at least one of the plurality of antennas 806, the receiver 8044 may be specifically configured to perform, for example, operation 402 in the method 400 shown in FIG. 4 and the operation performed by the receiving module 602 of the transmit end device 600 shown in FIG. 6.

The memory 808 may be storage media of a plurality of types, for example, a RAM, a ROM, a NVRAM, a PROM, an EPROM, an EEPROM, a flash memory, an optical memory, and a register. The memory 808 is specifically configured to store the instruction 8082 and the data 8084. The processor 802 may perform the foregoing steps and/or operations by reading and executing the instruction 8082 stored in the memory 808, and may need to use the data 8084 in the process of performing the foregoing operations and/or steps.

The I/O interface 810 is configured to: receive an instruction and/or data from a peripheral device, and output an instruction and/or data to the peripheral device.

It should be noted that in a specific implementation process, the communications device 800 may further include other hardware components that are not enumerated in this specification.

A person of ordinary skill in the art may understand that all or some of the steps and/operations of the foregoing methods may be implemented by a program instructing related hardware. The program may be stored in a computer readable storage medium. The computer readable storage medium is a ROM, a RAM, an optical disc, or the like.

To sum up, the foregoing descriptions are merely embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A precoding vector indicating method, comprising:
determining a plurality of component vectors of an ideal precoding vector and a weight of each component vector based on one or more basic codebooks, wherein each component vector is a column vector of one of the one or more basic codebooks, wherein the one or more basic codebooks include a first basic codebook defined as:

$$B = \begin{bmatrix} G & G \\ G\psi & -G\psi \end{bmatrix},$$

wherein B represents the first basic codebook and $G = (D_{N_1, O_1}) \otimes (D_{N_2, O_2})$, wherein an element $d(m_1, n_1)$ in a matrix $D_{N_1, O_1}$ is defined as:

$$d(m_1, n_1) = e^{j\frac{2\pi}{N_1} m_1 n_1} \text{ or } d(m_1, n_1) = e^{-j\frac{2\pi}{N_1} m_1 n_1},$$

wherein $O_1$ and $N_1$ are preset values, both $O_1$ and $N_1$ are positive integers, $0 \leq m_1 \leq N_1 - 1$, and $0 \leq n_1 \leq O_1 N_1 - 1$,
wherein an element $d(m_2, n_2)$ in a matrix $D_{N_2, O_2}$ is defined as:

$$d(m_2, n_2) = e^{j\frac{2\pi}{N_2} m_2 n_2} \text{ or } d(m_2, n_2) = e^{-j\frac{2\pi}{N_2} m_2 n_2},$$

wherein $O_2$ and $N_2$ are preset values, both $O_2$ and $N_2$ are positive integers, $0 \leq m_2 \leq N_2 - 1$,
wherein $\psi$ is a diagonal matrix, and an $i^{th}$ element $\Lambda_{ii}$ on a main diagonal of the diagonal matrix is defined as:

$\Lambda_{ii} = e^{jx}$, wherein $1 \leq i \leq O_1 O_2 N_1 N_2$, x is a codebook parameter, and $0 \leq x \leq 2\pi$; and sending a precoding vector indicator, wherein the precoding vector indicator is used to indicate the plurality of component vectors and the weight of each component vector.

2. The method according to claim 1, wherein the one or more basic codebooks include a second basic codebook defined as:

$$B = \begin{bmatrix} G & G \\ G\psi & -G\psi \end{bmatrix},$$

wherein B represents the second basic codebook and
$G = (L_{N_1}^{k_1} D_{N_1}) \otimes (L_{N_2}^{k_2} D_{N_2})$,
wherein an element $d(m_1, n_1)$ in a matrix $D_{N_1}$ is defined as:

$$d(m_1, n_1) = e^{j\frac{2\pi}{O_1 N_1} m_1 n_1} \text{ or } d(m_1, n_1) = e^{-j\frac{2\pi}{O_1 N_1} m_1 n_1},$$

wherein $N_1$ is a preset value, $N_1$ is a positive integer, $0 \le m_1 - 1$, and $0 \le n_1 \le N_1 = 1$;
wherein an element $d(m_2, n_2)$ in a matrix $D_{N_2}$ is defined as:

$$d(m_2, n_2) = e^{j\frac{2\pi}{O_2 N_2} m_2 n_2} \text{ or } d(m_2, n_2) = e^{-j\frac{2\pi}{O_2 N_2} m_2 n_2},$$

wherein $N_2$ is a preset value, $N_2$ is a positive integer, $0 \le m_2 \le N_2 - 1$, and $0 \le n_2 \le N_2 - 1$,
wherein $L_{N_1}^{k_1}$ is a diagonal matrix, and if $$d(m_1, n_1) = e^{j\frac{2\pi}{N_1} m_1 n_1},$$

the diagonal matrix $L_{N_1}^{k_1}$ is defined as:

$$L_{N_1}^{k_1} = \text{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1 - 1)}\right]\right),$$

or
if $$d(m_1, n_1) = e^{-j\frac{2\pi}{N_1} m_1 n_1},$$

the diagonal matrix $L_{N_1}^{k_1}$ is defined as:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1 - 1)}\right]\right),$$

wherein $O_1$ is a preset value, $O_1$ is a positive integer, $k_1$ is a first codebook parameter, $k_1$ is an integer, and $0 \le k_1 \le O_1 - 1$, and $L_{N_2}^{k_2}$ is a diagonal matrix,
wherein if $$d(m_2, n_2) = e^{j\frac{2\pi}{N_2} m_2 n_2},$$

the diagonal matrix $L_{N_2}^{k_2}$ is defined as:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2 - 1)}\right]\right),$$

or
if $$d(m_2, n_2) = e^{-j\frac{2\pi}{N_2} m_2 n_2},$$

the diagonal matrix $L_{N_2}^{k_2}$ is defined as:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2 - 1)}\right]\right),$$

wherein $O_2$ is a preset value, $O_2$ is a positive integer, $k_2$ is a second codebook parameter, $k_2$ is an integer, and $0 \le k_2 \le O_2 - 1$,
wherein $\psi$ is a diagonal matrix, and an $i^{th}$ element $\Lambda_{ii}$ on a main diagonal of the diagonal matrix is defined as:

$$\Lambda_{ii} = e^{jx},$$

wherein $1 \le i \le O_1 O_2 N_1 N_2$, x is a third codebook parameter, and $0 \le x \le 2\pi$.

3. The method according to claim 1, wherein the one or more basic codebooks include a third basic codebook defined as:

$$B = \begin{bmatrix} (L_{N_1}^{k_1} D_{N_1}) \otimes (L_{N_2}^{k_2} D_{N_2}) & (L_{N_1}^{k_1} D_{N_1}) \otimes (L_{N_2}^{k_2} D_{N_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix},$$

wherein B represents the third basic codebook, and an element $d(m_1, n_1)$ in a matrix $D_{N_1}$ is defined as:

$$d(m_1, n_1) = e^{j\frac{2\pi}{N_1} m_1 n_1} \text{ or } d(m_1, n_1) = e^{-j\frac{2\pi}{N_1} m_1 n_1},$$

wherein $N_1$ is a preset value, $N_1$ is a positive integer, $0 \le m_1 \le N_1 - 1$, and $0 \le n_1 \le N_1 - 1$,
wherein an element $d(m_2, n_2)$ in a matrix $D_{N_2}$ is defined as:

$$d(m_2, n_2) = e^{j\frac{2\pi}{N_2} m_2 n_2} \text{ or } d(m_2, n_2) = e^{-j\frac{2\pi}{N_2} m_2 n_2},$$

wherein $N_2$ is a preset value, $N_2$ is a positive integer, $0 \le m_2 \le N_2 - 1$, $0 \le n_2 \le N_2 - 1$,
wherein $L_{N_1}^{k_1}$, is a diagonal matrix, and if $$d(m_1, n_1) = e^{j\frac{2\pi}{N_1} m_1 n_1},$$

the diagonal matrix $L_{N_1}^{k_1}$ is defined as:

$$L_{N_1}^{k_1} = \mathrm{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$$

or
if $$d(m_1, n_1) = e^{-j\frac{2\pi}{N_1} m_1 n_1},$$

the diagnol matrix $L_{N_1}^{k_1}$ is defined as:

$$L_{N_1}^{k_1} = \mathrm{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \le k_1 \le O_1 - 1$, and $L_{N_2}^{k_2}$ is a diagonal matrix,
wherein if $$d(m_2, n_2) = e^{j\frac{2\pi}{N_2} m_2 n_2},$$

the diagonal matrix $L_{N_2}^{k_2}$ is defined as:

$$L_{N_2}^{k_2} = \mathrm{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2} m_2 n_2},$$

the diagonal matrix $L_{N_2}^{k_2}$ is defined as:

$$L_{N_2}^{k_2} = \mathrm{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \le k_2 \le O_2 - 1$,
wherein $R_{N_1}^{q_1}$ is a diagonal matrix, and if $$d(m_1, n_1) = e^{j\frac{2\pi}{N_1} m_1 n_1},$$

the diagonal matrix $R_{N_1}^{q_1}$ is defined as:

$$R_{N_1}^{q_1} = \mathrm{diag}\left(\left[e^{j\frac{2\pi q_1}{Q_1 N_1} 0}, e^{j\frac{2\pi q_1}{Q_1 N_1} 1}, \ldots, e^{j\frac{2\pi q_1}{Q_1 N_1}(N_1-1)}\right]\right),$$

or
if $$d(m_1, n_1) = e^{-j\frac{2\pi}{N_1} m_1 n_1},$$

if the diagonal matrix $R_{N_1}^{q_1}$ is defined as:

$$R_{N_1}^{q_1} = \mathrm{diag}\left(\left[e^{-j\frac{2\pi q_1}{Q_1 N_1} 0}, e^{-j\frac{2\pi q_1}{Q_1 N_1} 1}, \ldots, e^{-j\frac{2\pi q_1}{Q_1 N_1}(N_1-1)}\right]\right),$$

wherein $Q_1$ is a preset value, $Q_1$ is a positive integer, $q_1$ is a third codebook parameter, $q_1$, is an integer, and $-(Q_1-1) \le q_1 \le (Q_1-1)$,
wherein $R_{N_2}^{q_2}$ is a diagonal matrix, and if $$d(m_2, n_n) = e^{j\frac{2\pi}{N_2} m_2 n_2},$$

the diagonal matrix $R_{N_2}^{q_2}$ is defined as:

$$R_{N_2}^{q_2} = \mathrm{diag}\left(\left[e^{j\frac{2\pi q_2}{Q_2 N_2} 0}, e^{j\frac{2\pi q_2}{Q_2 N_2} 1}, \ldots, e^{j\frac{2\pi q_2}{Q_2 N_2}(N_2-1)}\right]\right),$$

or
if $$d(m_2, n_n) = e^{-j\frac{2\pi}{N_2} m_2 n_2},$$

the diagonal matrix $R_{N_2}^{q_2}$ is defined as:

$$R_{N_2}^{q_2} = \mathrm{diag}\left(\left[e^{-j\frac{2\pi q_2}{Q_2 N_2} 0}, e^{-j\frac{2\pi q_2}{Q_2 N_2} 1}, \ldots, e^{-j\frac{2\pi q_2}{Q_2 N_2}(N_2-1)}\right]\right),$$

wherein $Q_2$ is a preset value, $Q_2$ is a positive integer, $q_2$, is a fourth codebook parameter, $q_2$ is an integer, and $-(Q_2-1) \le q_2 \le (Q_2-1)$.

4. The method according to claim 1, wherein the one or more basic codebooks include a fourth basic codebook defined as:

$$B = \begin{bmatrix} (L_{N_1}^{k_1} D_{N_1} R_{N_1}^{p_1}) \otimes (L_{N_2}^{k_2} D_{N_2} R_{N_2}^{p_2}) & (L_{N_1}^{k_1} D_{N_1} R_{N_1}^{p_1}) \otimes (L_{N_2}^{k_2} D_{N_2} R_{N_2}^{p_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix},$$

wherein B represents the fourth basic codebook, and an element $d(m_1, n_1)$ in a matrix $D_{N_1}$ is defined as:

$$d(m_1, n_1) = e^{j\frac{2\pi}{N_1} m_1 n_1} \text{ or } d(m_1, n_1) = e^{-j\frac{2\pi}{N_1} m_1 n_1},$$

wherein $N_1$ is a preset value, $N_1$ is a positive integer, $0 \le m_1 \le N_1 - 1$, and $0 \le n_1 \le N_1 - 1$, wherein an element d(m$_2$,n$_2$) in a matrix D$_{N_2}$ is defined as:

$$d(m_2, n_2) = e^{j\frac{2\pi}{N_2}m_2n_2} \text{ or } d(m_2, n_2) = e^{-j\frac{2\pi}{N_2}m_2n_2},$$

wherein N$_2$ is a preset value, N$_2$ is a positive integer, 0≤m$_2$≤N$_2$-1, 0≤n$_2$≤N$_2$-1,
wherein L$_{N_1}^{k_1}$ is a diagonal matrix, and if $$d(m_1, n_1) = e^{j\frac{2\pi}{N_1}m_1n_1},$$

the diagonal matrix L$_{N_1}^{k_1}$ is defined as:

$$L_{N_1}^{k_1} = \text{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or
if $$d(m_1, n_1) = e^{-j\frac{2\pi}{N_1}m_1n_1},$$

the diagonal matrix L$_{N_1}^{k_1}$ is defined as:

$$L_{N_1}^{k_1} = \text{diag}\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

wherein O$_1$ is a preset value, O$_1$ is a positive integer, k$_1$ is a first codebook parameter, k$_1$ is an integer, and 0≤k$_1$≤O$_1$-1,
wherein L$_{N_2}^{k_2}$ is a diagonal matrix, and if $$d(m_2, n_2) = e^{j\frac{2\pi}{N_2}m_2n_2},$$

the diagonal matrix L$_{N_2}^{k_2}$ is defined as:

$$L_{N_2}^{k_2} = \text{diag}\left(\left[e^{j\frac{2\pi k_2}{O_2 N_2}0}, e^{j\frac{2\pi k_2}{O_2 N_2}1}, \ldots, e^{j\frac{2\pi k_2}{O_2 N_2}(N_2-1)}\right]\right),$$

or
if $$d(m_2, n_2) = e^{-j\frac{2\pi}{N_2}m_2n_2},$$

the diagonal matrix L$_{N_2}^{k_2}$ is defined as:

$$L_{N_2}^{k_2} = \text{diag}\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

wherein O$_2$ is a preset value, O$_2$ is a positive integer, k$_2$ is a second codebook parameter, k$_2$ is an integer, and 0≤k$_2$≤O$_2$-1, wherein R$_{N_1}^{p_1}$ is a diagonal matrix; and if $$d(m_1, n_1) = e^{j\frac{2\pi}{N_1}m_1n_1},$$

the diagonal matrix R$_{N_1}^{p_1}$ is defined as:

$$R_{N_1}^{p_1} = \text{diag}\left(\left[e^{j\frac{2\pi p_1}{Q_1 N_1}0}, e^{j\frac{2\pi p_1}{Q_1 N_1}1}, \ldots, e^{j\frac{2\pi p_1}{Q_1 N_1}(N_1-1)}\right]\right),$$

or
if $$d(m_1, n_1) = e^{-j\frac{2\pi}{N_1}m_1n_1},$$

the diagonal matrix R$_{N_1}^{p_1}$ is defined as:

$$R_{N_1}^{p_1} = \text{diag}\left(\left[e^{-j\frac{2\pi p_1}{Q_1 N_1}0}, e^{-j\frac{2\pi p_1}{Q_1 N_1}1}, \ldots, e^{-j\frac{2\pi p_1}{Q_1 N_1}(N_1-1)}\right]\right),$$

wherein Q$_1$ is a preset value, Q$_1$ is a positive integer, p$_1$ is a third codebook parameter, p$_1$ is an integer, and 0≤p$_1$≤(Q$_1$-1);
R$_{N_2}^{p_2}$ is a diagonal matrix; and if $$d(m_2, n_2) = e^{j\frac{2\pi}{N_2}m_2n_2},$$

the diagonal matrix R$_{N_2}^{p_2}$ is defined as:

$$R_{N_2}^{p_2} = \text{diag}\left(\left[e^{j\frac{2\pi p_2}{Q_2 N_2}0}, e^{j\frac{2\pi p_2}{Q_2 N_2}1}, \ldots, e^{j\frac{2\pi p_2}{Q_2 N_2}(N_2-1)}\right]\right),$$

or
if $$d(m_2, n_2) = e^{-j\frac{2\pi}{N_2}m_2n_2},$$

the diagonal matrix R$_{N_2}^{p_2}$ is defined as:

$$R_{N_2}^{p_2} = \text{diag}\left(\left[e^{-j\frac{2\pi p_2}{Q_2 N_2}0}, e^{-j\frac{2\pi p_2}{Q_2 N_2}1}, \ldots, e^{-j\frac{2\pi p_2}{Q_2 N_2}(N_2-1)}\right]\right),$$

wherein Q$_2$ is a preset value, Q$_2$ is a positive integer, p$_2$ is a fourth codebook parameter, p$_2$ is an integer, and 0≤p$_2$≤(Q$_2$-1),
wherein R$_{N_1}^{q_1}$ is a diagonal matrix; and if $$d(m_1, n_1) = e^{j\frac{2\pi}{N_1}m_1n_1},$$

the diagonal matrix $R_{N_1}^{q_1}$ is defined as:

$$R_{N_1}^{q_1} = \mathrm{diag}\left(\left[e^{j\frac{2\pi q_1}{Q_1 N_1}0}, e^{j\frac{2\pi q_1}{Q_1 N_1}1}, \ldots, e^{j\frac{2\pi q_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ is defined as:

$$R_{N_1}^{q_1} = \mathrm{diag}\left(\left[e^{-j\frac{2\pi q_1}{Q_1 N_1}0}, e^{-j\frac{2\pi q_1}{Q_1 N_1}1}, \ldots, e^{-j\frac{2\pi q_1}{Q_1 N_1}(N_1-1)}\right]\right),$$

wherein $Q_3$ is a preset value, $Q_3$ is a positive integer, $q_1$ is a fifth codebook parameter, $q_1$ is an integer, and $0 \leq q_1 \leq (Q_3-1)$,
wherein $R_{N_2}^{q_2}$ a diagonal matrix; and if $$d(m_2, n_2) = e^{j\frac{2\pi}{N_2}m_2 n_2},$$

the diagonal matrix $R_{N_2}^{q_2}$ is defined as:

$$R_{N_2}^{q_2} = \mathrm{diag}\left(\left[e^{j\frac{2\pi q_2}{Q_2 N_2}0}, e^{j\frac{2\pi q_2}{Q_2 N_2}1}, \ldots, e^{j\frac{2\pi q_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ is defined as:

$$R_{N_2}^{q_2} = \mathrm{diag}\left(\left[e^{-j\frac{2\pi q_2}{Q_2 N_2}0}, e^{-j\frac{2\pi q_2}{Q_2 N_2}1}, \ldots, e^{-j\frac{2\pi q_2}{Q_2 N_2}(N_2-1)}\right]\right),$$

wherein $Q_4$ is a preset value, $Q_4$ is a positive integer, $q_2$ is a sixth codebook parameter, $q_2$ is an integer, and $0 \leq q_2 \leq (Q_4-1)$.

5. The method according to claim 1, wherein the one or more basic codebooks include a fifth basic codebook defined as:

$$B = \begin{bmatrix} \left(L_{N_1}^{k_1} D_{N_1} R_{N_1}^{q_1}\right) \otimes \left(L_{N_2}^{k_2} D_{N_2} R_{N_2}^{q_2}\right) & \left(L_{N_1}^{k_1} D_{N_1} R_{N_1}^{q_1}\right) \otimes \left(L_{N_2}^{k_2} D_{N_2} R_{N_2}^{q_2}\right) \\ \left(L_{N_1}^{k_1} D_{N_1}\right) \otimes \left(L_{N_2}^{k_2} D_{N_2}\right) & -\left(L_{N_1}^{k_1} D_{N_1}\right) \otimes \left(L_{N_2}^{k_2} D_{N_2}\right) \end{bmatrix},$$

wherein B represents the fifth basic codebook, and an element $d(m_1, n_1)$ in a matrix $D_{N_1}$ is defined as:

$$d(m_1, n_1) = e^{j\frac{2\pi}{N_1}m_1 n_1} \text{ or } d(m_1, n_1) = e^{-j\frac{2\pi}{N_1}m_1 n_1},$$

wherein $N_1$ is a preset value, $N_1$ is a positive integer, $0 \leq m_1 \leq N_1-1$, and $0 \leq n_1 \leq N_1-1$,
wherein an element $d(m_2, n_2)$ in a matrix $D_{N_2}$ is defined as:

$$d(m_2, n_2) = e^{j\frac{2\pi}{N_2}m_2 n_2} \text{ or } d(m_2, n_2) = e^{-j\frac{2\pi}{N_2}m_2 n_2},$$

wherein $N_2$ is a preset value, $N_2$ is a positive integer, $0 \leq m_2 \leq N_2-1$, and $0 \leq n_2 \leq N_2-1$,
wherein $L_{N_1}^{k_1}$ is a diagonal matrix; and if $$d(m_1, n_1) = e^{j\frac{2\pi}{N_1}m_1 n_1},$$

wherein the diagonal matrix $L_{N_1}^{k_1}$ is defined as:

$$L_{N_1}^{k_1} = \mathrm{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ is defined as:

$$L_{N_1}^{k_1} = \mathrm{diag}\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \leq k_1 \leq O_1-1$,
wherein $L_{N_2}^{k_2}$ is a diagonal matrix; and if $$d(m_2, n_2) = e^{j\frac{2\pi}{N_2}m_2 n_2},$$

the diagonal matrix $L_{N_2}^{k_2}$ is defined as:

$$L_{N_2}^{k_2} = \mathrm{diag}\left(\left[e^{j\frac{2\pi k_2}{O_2 N_2}0}, e^{j\frac{2\pi k_2}{O_2 N_2}1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ is defined as:

$$L_{N_2}^{k_2} = \mathrm{diag}\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2-1$, wherein $R_{N_1}^{q_1}$ is a diagonal matrix, and if $$d(m_1, n_1) = e^{j\frac{2\pi}{N_1}m_1 n_1},$$

the diagonal matrix $R_{N_1}^{q_1}$ is defined as:

$$R_{N_1}^{q_1} = \text{diag}\left(\left[e^{j\frac{2\pi q_1}{Q_1 N_1}0}, e^{j\frac{2\pi q_1}{Q_1 N_1}1}, \ldots, e^{j\frac{2\pi q_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ is defined as:

$$R_{N_2}^{q_2} = \text{diag}\left(\left[e^{-j\frac{2\pi q_2}{Q_2 N_2}0}, e^{-j\frac{2\pi q_2}{Q_2 N_2}1}, \ldots, e^{-j\frac{2\pi q_2}{Q_2 N_2}(N_2-1)}\right]\right),$$

wherein $Q_1$ is a preset value, $Q_1$ is a positive integer, $q_1$ is a third codebook parameter, $q_1$ is an integer, and $-(Q_1-1) \leq q_1 \leq (Q_1-1)$, wherein $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ is defined as:

$$R_{N_2}^{q_2} = \text{diag}\left(\left[e^{j\frac{2\pi q_2}{Q_4 N_2}0}, e^{j\frac{2\pi q_2}{Q_4 N_2}1}, \ldots, e^{j\frac{2\pi q_2}{Q_4 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ is defined as:

$$R_{N_2}^{q_2} = \text{diag}\left(\left[e^{-j\frac{2\pi q_2}{Q_4 N_2}0}, e^{-j\frac{2\pi q_2}{Q_4 N_2}1}, \ldots, e^{-j\frac{2\pi q_2}{Q_4 N_2}(N_2-1)}\right]\right),$$

wherein $Q_2$ is a preset value, $Q_2$ is a positive integer, $q_2$ is a fourth codebook parameter, $q_2$ is an integer, and $-(Q_2-1) \leq q_2 \leq (Q_2-1)$.

6. A receive end device, comprising:
a processor;
a memory;
wherein the processor is configured to execute program instructions stored in the memory to perform operations comprising:

determining a plurality of component vectors of an ideal preceding vector and a weight of each component vector based on one or more basic codebooks, wherein each component vector is a column vector of one of the one or more basic codebooks, wherein the one or more codebooks include a first basic codebook defined as:

$$B = \begin{bmatrix} G & G \\ G\psi & -G\psi \end{bmatrix},$$

wherein B represents the first basic codebook and $G = (D_{N_1, O_1}) \otimes (D_{N_2, O_2})$, wherein an element $d(m_1, n_1)$ in a matrix $D_{N_1, O_1}$ is defined as:

$$d(m_1, n_1) = e^{j\frac{2\pi}{N_1}m_1 n_1} \quad \text{or} \quad d(m_1, n_1) = e^{-j\frac{2\pi}{N_1}m_1 n_1},$$

wherein $O_1$ and $N_1$ are preset values, both $O_1$ and $N_1$ are positive integers,
$0 \leq m_1 \leq N_1-1$, and $0 \leq n_1 \leq N_1-1$, wherein an element $d(m_2, n_2)$ in a matrix $D_{N_2, O_2}$ is defined as:

$$d(m_2, n_2) = e^{j\frac{2\pi}{N_2}m_2 n_2} \quad \text{or} \quad d(m_2, n_2) = e^{-j\frac{2\pi}{N_2}m_2 n_2},$$

wherein $O_2$ and $N_2$ are preset values, both $O_2$ and $N_2$ are positive integers,
$0 \leq m_2 \leq N_2-1$, wherein $\psi$ is a diagonal matrix, and an $i^{th}$ element $\Lambda_{ii}$ on a main diagonal of the diagonal matrix is defined as:

$\Lambda_{ii} = e^{jx}$, wherein $1 \leq i \leq O_1 O_2 N_1 N_2$, x is a codebook parameter, and $0 \leq x \leq 2\pi$, and sending a precoding vector indicator, wherein the precoding vector indicator is used to indicate the plurality of component vectors and the weight of each component vector.

7. The device according to claim 6, wherein the one or more basic codebooks include a second basic codebook defined as:

$$B = \begin{bmatrix} G & G \\ G\psi & -G\psi \end{bmatrix},$$

wherein B represents the second basic codebook and $G = (L_{N_1}^{k_1} D_{N_1}) \otimes (L_{N_2}^{k_2} D_{N_2})$, wherein an element $d(m_1, n_1)$ in a matrix $D_{N_1}$ is defined as:

$$d(m_1, n_1) = e^{j\frac{2\pi}{O_1 N_1}m_1 n_1} \quad \text{or} \quad d(m_1, n_1) = e^{-j\frac{2\pi}{O_1 N_1}m_1 n_1},$$

wherein $N_1$ is a preset value, $N_1$ is a positive integer, $0 \leq m_1 \leq N_1-1$, and
$0 \leq n_1 \leq N_1-1$, wherein an element $d(m_2,n_2)$ in a matrix $D_{N_2}$ is defined as:

$$d(m_2, n_2) = e^{j\frac{2\pi}{O_2 N_2}m_2 n_2} \text{ or } d(m_2, n_2) = e^{-j\frac{2\pi}{O_2 N_2}m_2 n_2},$$

wherein $N_2$ is a preset value, $N_2$ is a positive integer, $0 \leq m_2 \leq N_2-1$, and $0 \leq n_2 \leq N_2-1$,
wherein $L_{N_1}^{k_1}$ is a diagonal matrix, and if $$d(m_1, n_1) = e^{j\frac{2\pi}{N_1}m_1 n_1},$$

the diagonal matrix $L_{N_1}^{k_1}$ is defined as:

$$L_{N_1}^{k_1} = \text{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ is defined as:

$$L_{N_1}^{k_1} = \text{diag}\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \leq k_1 \leq O_1-1$, and $L_{N_2}^{k_2}$ is a diagonal matrix,
wherein if $$d(m_2, n_2) = e^{j\frac{2\pi}{N_2}m_2 n_2},$$

the diagonal matrix $L_{N_2}^{k_2}$ is defined as:

$$L_{N_2}^{k_2} = \text{diag}\left(\left[e^{j\frac{2\pi k_2}{O_2 N_2}0}, e^{j\frac{2\pi k_2}{O_2 N_2}1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ is defined as:

$$L_{N_2}^{k_2} = \text{diag}\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2-1$, wherein $\psi$ is a diagonal matrix, and an $i^{th}$ element $\Lambda_{ii}$ on a main diagonal of the diagonal matrix is defined as:

$$\Lambda_{ii} = e^{jx},$$

wherein $1 \leq i \leq O_1 O_2 N_1 N_2$, $x$ is a third codebook parameter, and $0 \leq x \leq 2\pi$.

8. The device according to claim 6, wherein the one or more basic codebooks include a third basic codebook defined as:

$$B = \begin{bmatrix} (L_{N_1}^{k_1} D_{N_1}) \otimes (L_{N_2}^{k_2} D_{N_2}) & (L_{N_1}^{k_1} D_{N_1}) \otimes (L_{N_2}^{k_2} D_{N_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix},$$

wherein B represents the third basic codebook, and an element $d(m_1,n_1)$ in a matrix $D_{N_1}$ is defined as:

$$d(m_1, n_1) = e^{j\frac{2\pi}{N_1}m_1 n_1} \text{ or } d(m_1, n_1) = e^{-j\frac{2\pi}{N_1}m_1 n_1},$$

wherein $N_1$ is a preset value, $N_1$ is a positive integer, $0 \leq m_1 \leq N_1-1$, and $0 \leq n_1 \leq N_1-1$,
wherein an element $d(m_2,n_2)$ in a matrix $D_{N_2}$ is defined as:

$$d(m_2, n_2) = e^{j\frac{2\pi}{N_2}m_2 n_2} \text{ or } d(m_2, n_2) = e^{-j\frac{2\pi}{N_2}m_2 n_2},$$

wherein $N_2$ is a preset value, $N_2$ is a positive integer, $0 \leq m_2 \leq N_2-1$, and $0 \leq n_2 \leq N_2-1$,
wherein $L_{N_1}^{k_1}$ is a diagonal matrix, and if $$d(m_1, n_1) = e^{j\frac{2\pi}{N_1}m_1 n_1},$$

the diagonal matrix $L_{N_1}^{k_1}$ is defined as:

$$L_{N_1}^{k_1} = \text{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ is defined as:

$$L_{N_1}^{k_1} = \text{diag}\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \leq k_1 \leq O_1-1$, and $L_{N_2}^{k_2}$ is a diagonal matrix,
wherein if $$d(m_2, n_2) = e^{j\frac{2\pi}{N_2}m_2 n_2},$$

the diagonal matrix $L_{N_2}^{k_2}$ is defined as:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2} m_2 n_2},$$

the diagonal matrix $L_{N_2}^{k_2}$ is defined as:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2 - 1$,
wherein $R_{N_1}^{q_1}$ is a diagonal matrix, and if $$d(m_1, n_1) = e^{j\frac{2\pi}{N_1} m_1 n_1},$$

the diagonal matrix $R_{N_1}^{q_1}$ is defined as:

$$R_{N_1}^{q_1} = \text{diag}\left(\left[e^{j\frac{2\pi q_1}{Q_1 N_1} 0}, e^{j\frac{2\pi q_1}{Q_1 N_1} 1}, \ldots, e^{j\frac{2\pi q_1}{Q_1 N_1}(N_1-1)}\right]\right),$$

or
if $$d(m_1, n_1) = e^{-j\frac{2\pi}{N_1} m_1 n_1},$$

the diagonal matrix $R_{N_1}^{q_1}$ is defined as:

$$R_{N_1}^{q_1} = \text{diag}\left(\left[e^{-j\frac{2\pi q_1}{Q_1 N_1} 0}, e^{-j\frac{2\pi q_1}{Q_1 N_1} 1}, \ldots, e^{-j\frac{2\pi q_1}{Q_1 N_1}(N_1-1)}\right]\right),$$

wherein $Q_1$ is a preset value, $Q_1$ is a positive integer, $q_1$ is a third codebook parameter, $q_1$ is an integer, and $-(Q_1-1) \leq q_1 \leq (Q_1-1)$,
wherein $R_{N_2}^{q_2}$ is a diagonal matrix, and if $$d(m_2, n_2) = e^{j\frac{2\pi}{N_2} m_2 n_2},$$

the diagonal matrix $R_{N_2}^{q_2}$ is defined as:

$$R_{N_2}^{q_2} = \text{diag}\left(\left[e^{j\frac{2\pi q_2}{Q_2 N_2} 0}, e^{j\frac{2\pi q_2}{Q_2 N_2} 1}, \ldots, e^{j\frac{2\pi q_2}{Q_2 N_2}(N_2-1)}\right]\right),$$

or
if $$d(m_2, n_2) = e^{-j\frac{2\pi}{N_2} m_2 n_2},$$

the diagonal matrix $R_{N_2}^{q_2}$ is defined as:

$$R_{N_2}^{q_2} = \text{diag}\left(\left[e^{-j\frac{2\pi q_2}{Q_2 N_2} 0}, e^{-j\frac{2\pi q_2}{Q_2 N_2} 1}, \ldots, e^{-j\frac{2\pi q_2}{Q_2 N_2}(N_2-1)}\right]\right),$$

wherein $Q_2$ is a preset value, $Q_2$ is a positive integer, $q_2$ is a fourth codebook parameter, $q_2$ is an integer, and $-(Q_2-1) \leq q_2 \leq (Q_2-1)$.

9. The device according to claim 6, wherein the one or more basic codebooks include a fourth basic codebook defined as:

$$B = \begin{bmatrix} (L_{N_1}^{k_1} D_{N_1} R_{N_1}^{p_1}) \otimes (L_{N_2}^{k_2} D_{N_2} R_{N_2}^{p_2}) & (L_{N_1}^{k_1} D_{N_1} R_{N_1}^{p_1}) \otimes (L_{N_2}^{k_2} D_{N_2} R_{N_2}^{p_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix},$$

wherein B represents the fourth basic codebook, and an element $d(m_1, n_1)$ in a matrix $D_{N_1}$ is defined as:

$$d(m_1, n_1) = e^{j\frac{2\pi}{N_1} m_1 n_1} \text{ or } d(m_1, n_1) = e^{-j\frac{2\pi}{N_1} m_1 n_1},$$

wherein $N_1$ is a preset value, $N_1$ is a positive integer, $0 \leq m_1 \leq N_1 - 1$, and $0 \leq n_1 \leq n_1 - 1$,
wherein an element $d(m_2, n_2)$ in a matrix $D_{N_2}$ is defined as:

$$d(m_2, n_2) = e^{j\frac{2\pi}{N_2} m_2 n_2} \text{ or } d(m_2, n_2) = e^{-j\frac{2\pi}{N_2} m_2 n_2},$$

wherein $N_2$ is a preset value, $N_2$ is a positive integer, $0 \leq m_2 \leq N_2 - 1$, and $0 \leq n_2 \leq N_2 - 1$,
wherein $L_{N_1}^{k_1}$ is a diagonal matrix, and if $$d(m_1, n_1) = e^{j\frac{2\pi}{N_1} m_1 n_1},$$

the diagonal matrix $L_{N_1}^{k_1}$ is defined as:

$$L_{N_1}^{k_1} = \text{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$$

or
if $$d(m_1, n_1) = e^{-j\frac{2\pi}{N_1} m_1 n_1},$$

the diagonal matrix $L_{N_1}^{k_1}$ is defined as:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \le k_1 \le O_1-1$, wherein $L_{N_2}^{k_2}$ is a diagonal matrix, and if $$d(m_2, n_2) = e^{j\frac{2\pi}{N_2}m_2 n_2},$$

the diagonal matrix $L_{N_2}^{k_2}$ is defined as:

$$L_{N_2}^{k_2} = \text{diag}\left(\left[e^{j\frac{2\pi k_2}{O_2 N_2}0}, e^{j\frac{2\pi k_2}{O_2 N_2}1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ is defined as:

$$L_{N_2}^{k_2} = \text{diag}\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \le k_2 \le O_2-1$, wherein $R_{N_1}^{p_1}$ is a diagonal matrix; and if $$d(m_1, n_1) = e^{j\frac{2\pi}{N_1}m_1 n_1},$$

the diagonal matrix $R_{N_1}^{p_1}$ is defined as:

$$R_{N_1}^{p_1} = \text{diag}\left(\left[e^{j\frac{2\pi p_1}{Q_1 N_1}0}, e^{j\frac{2\pi p_1}{Q_1 N_1}1}, \ldots, e^{j\frac{2\pi p_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{p_1}$ is defined as:

$$L_{N_1}^{p_1} = \text{diag}\left(\left[e^{-j\frac{2\pi p_1}{O_1 N_1}0}, e^{-j\frac{2\pi p_1}{O_1 N_1}1}, \ldots, e^{-j\frac{2\pi p_1}{O_1 N_1}(N_1-1)}\right]\right),$$

wherein $Q_1$ is a preset value, $Q_1$ is a positive integer, $p_1$ is a third codebook parameter, $p_1$ is an integer, and $0 \le p_1 \le (Q_1-1)$;

$R_{N_2}^{p_2}$ is a diagonal matrix; and if $$d(m_2, n_2) = e^{j\frac{2\pi}{N_2}m_2 n_2},$$

the diagonal matrix $R_{N_2}^{p_2}$ is defined as:

$$R_{N_1}^{p_1} = \text{diag}\left(\left[e^{j\frac{2\pi p_1}{O_1 N_1}0}, e^{j\frac{2\pi p_1}{O_1 N_1}1}, \ldots, e^{j\frac{2\pi p_1}{O_1 N_1}(N_1-1)}\right]\right),$$

or
if $$d(m_2, n_2) = e^{-j\frac{2\pi}{N_2}m_2 n_2},$$

the diagonal matrix $R_{N_2}^{p_2}$ is defined as:

$$R_{N_2}^{p_2} = \text{diag}\left(\left[e^{-j\frac{2\pi p_2}{Q_2 N_2}0}, e^{-j\frac{2\pi p_2}{Q_2 N_2}1}, \ldots, e^{-j\frac{2\pi p_2}{Q_2 N_2}(N_2-1)}\right]\right),$$

wherein $Q_2$ is a preset value, $Q_2$ is a positive integer, $p_2$ is a fourth codebook parameter, $p_2$ is an integer, and $0 \le p_2 \le (Q_2-1)$, wherein $R_{N_1}^{q_1}$ is a diagonal matrix; and if $$d(m_1, n_1) = e^{j\frac{2\pi}{N_1}m_1 n_1},$$

the diagonal matrix $R_{N_1}^{q_1}$ is defined as:

$$R_{N_1}^{q_1} = \text{diag}\left(\left[e^{j\frac{2\pi q_1}{Q_3 N_1}0}, e^{j\frac{2\pi q_1}{Q_3 N_1}1}, \ldots, e^{j\frac{2\pi q_1}{Q_3 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ is defined as:

$$R_{N_1}^{q_1} = \text{diag}\left(\left[e^{-j\frac{2\pi q_1}{Q_1 N_1}0}, e^{-j\frac{2\pi q_1}{Q_1 N_1}1}, \ldots, e^{-j\frac{2\pi q_1}{Q_1 N_1}(N_1-1)}\right]\right),$$

wherein $Q_3$ is a preset value, $Q_3$ is a positive integer, $q_1$ is a fifth codebook parameter, $q_1$ is an integer, and $0 \le q_1 \le (Q_3-1)$, wherein $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ is defined as:

$$R_{N_2}^{q_2} = \text{diag}\left(\left[e^{j\frac{2\pi q_2}{Q_2 N_2}0}, e^{j\frac{2\pi q_2}{Q_2 N_2}1}, \ldots, e^{j\frac{2\pi q_2}{Q_2 N_2}(N_2-1)}\right]\right),$$

or if $$d(m_2, n_2) = e^{-j\frac{2\pi}{N_2}m_2 n_2},$$

the diagonal matrix $R_{N_2}^{q_2}$ is defined as:

$$R_{N_2}^{q_2} = \text{diag}\left(\left[e^{-j\frac{2\pi q_2}{Q_2 N_2}0}, e^{-j\frac{2\pi q_2}{Q_2 N_2}1}, \ldots, e^{-j\frac{2\pi q_2}{Q_2 N_2}(N_2-1)}\right]\right),$$

wherein $Q_4$ is a preset value, $Q_4$ is a positive integer, $q_2$ is a sixth codebook parameter, $q_2$ is an integer, and $0 \leq q_2 \leq (Q_4-1)$.

10. The device according to claim 6, wherein the one or more basic codebooks include a fifth basic codebook defined as:

$$B = \begin{bmatrix} (L_{N_1}^{k_1} D_{N_1} R_{N_1}^{q_1}) \otimes (L_{N_2}^{k_2} D_{N_2} R_{N_2}^{q_2}) & (L_{N_1}^{k_1} D_{N_1} R_{N_1}^{q_1}) \otimes (L_{N_2}^{k_2} D_{N_2} R_{N_2}^{q_2}) \\ (L_{N_1}^{k_1} D_{N_1}) \otimes (L_{N_2}^{k_2} D_{N_2}) & -(L_{N_1}^{k_1} D_{N_1}) \otimes (L_{N_2}^{k_2} D_{N_2}) \end{bmatrix},$$

wherein B represents the fifth basic codebook, and an element $d(m_1, n_1)$ in a matrix $D_{N_1}$ is defined as:

$$d(m_1, n_1) = e^{j\frac{2\pi}{N_1}m_1 n_1} \text{ or } d(m_1, n_1) = e^{-j\frac{2\pi}{N_1}m_1 n_1},$$

wherein $N_1$ is a preset value, $N_1$ is a positive integer, $0 \leq m_1 \leq N_1-1$, and $0 \leq n_1 \leq N_1-1$, wherein an element $d(m_2, n_2)$ in a matrix $D_{N_2}$ is defined as:

$$d(m_2, n_2) = e^{j\frac{2\pi}{N_2}m_2 n_2} \text{ or } d(m_2, n_2) = e^{-j\frac{2\pi}{N_2}m_2 n_2},$$

wherein $N_2$ is a preset value, $N_2$ is a positive integer, $0 \leq m_2 \leq N_2-1$, and $0 \leq n_1 \leq N_1-1$,
wherein $L_{N_1}^{k_1}$ is a diagonal matrix; and if $$d(m_1, n_1) = e^{j\frac{2\pi}{N_1}m_1 n_1},$$

wherein the diagonal matrix $L_{N_1}^{k_1}$ is defined as:

$$L_{N_1}^{k_1} = \text{diag}\left(\left[e^{j\frac{2\pi k_1}{O_1 N_1}0}, e^{j\frac{2\pi k_1}{O_1 N_1}1}, \ldots, e^{j\frac{2\pi k_1}{O_1 N_1}(N_1-1)}\right]\right),$$

or if $$d(m_1, n_1) = e^{-j\frac{2\pi}{N_1}m_1 n_1},$$

the diagonal matrix $L_{N_1}^{k_1}$ is defined as:

$$L_{N_1}^{k_1} = \text{diag}\left(\left[e^{-j\frac{2\pi k_1}{O_1 N_1}0}, e^{-j\frac{2\pi k_1}{O_1 N_1}1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \leq k_1 \leq O_1-1$, wherein $L_{N_2}^{k_2}$ is a diagonal matrix; and if $$d(m_2, n_2) = e^{j\frac{2\pi}{N_2}m_2 n_2},$$

the diagonal matrix $L_{N_2}^{k_2}$ is defined as:

$$L_{N_2}^{k_2} = \text{diag}\left(\left[e^{j\frac{2\pi k_2}{O_2 N_2}0}, e^{j\frac{2\pi k_2}{O_2 N_2}1}, \ldots, e^{j\frac{2\pi k_2}{O_2 N_2}(N_2-1)}\right]\right),$$

or if $$d(m_2, n_2) = e^{-j\frac{2\pi}{N_2}m_2 n_2},$$

the diagonal matrix $L_{N_2}^{k_2}$ is defined as:

$$L_{N_2}^{k_2} = \text{diag}\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2-1$, wherein $R_{N_1}^{q_1}$ is a diagonal matrix, and if $$d(m_1, n_1) = e^{j\frac{2\pi}{N_1}m_1 n_1},$$

the diagonal matrix $R_{N_1}^{q_1}$ is defined as:

$$R_{N_1}^{p_1} = \text{diag}\left(\left[e^{j\frac{2\pi p_1}{Q_1 N_1}0}, e^{j\frac{2\pi p_1}{Q_1 N_1}1}, \ldots, e^{j\frac{2\pi p_1}{Q_1 N_1}(N_1-1)}\right]\right),$$

or if $$d(m_1, n_1) = e^{-j\frac{2\pi}{N_1}m_1 n_1},$$

the diagonal matrix $R_{N_1}^{q_1}$ is defined as:

$$R_{N_1}^{q_1} = \text{diag}\left(\left[e^{-j\frac{2\pi q_1}{Q_3 N_1}0}, e^{-j\frac{2\pi q_1}{Q_3 N_1}1}, \ldots, e^{-j\frac{2\pi q_1}{Q_3 N_1}(N_1-1)}\right]\right),$$

wherein $Q_1$ is a preset value, $Q_1$ is a positive integer, $q_1$ is a third codebook parameter, $q_1$ is an integer, and $-(Q_1-1) \leq q_1 \leq (Q_1-1)$, wherein $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ is defined as:

$$R_{N_2}^{q_2} = \text{diag}\left(\left[e^{j\frac{2\pi q_2}{Q_2 N_2}0}, e^{j\frac{2\pi q_2}{Q_2 N_2}1}, \ldots, e^{j\frac{2\pi q_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ is defined as:

$$R_{N_2}^{q_2} = \text{diag}\left(\left[e^{-j\frac{2\pi q_2}{Q_2 N_2}0}, e^{-j\frac{2\pi q_2}{Q_2 N_2}1}, \ldots, e^{-j\frac{2\pi q_2}{Q_2 N_2}(N_2-1)}\right]\right),$$

wherein $Q_2$ is a preset value, $Q_2$ is a positive integer, $q_2$ is a fourth codebook parameter, $q_2$ is an integer, and $-(Q_2-1) \leq q_2 \leq (Q_2-1)$.

11. A precoding vector determining method, comprising: receiving a precoding vector indicator, wherein the precoding vector indicator is used to indicate a plurality of component vectors of an ideal precoding vector and a weight of each component vector that are determined based on one or more basic codebooks, and each component vector is a column vector of one of the one or more basic codebooks, wherein the one or more basic codebooks include a first basic codebook defined as:

$$B = \begin{bmatrix} G & G \\ G\psi & -G\psi \end{bmatrix},$$

wherein B represents the first basic codebook and
$G = (D_{N_1, o_1}) \otimes (D_{n_2, o_2})$,
wherein an element $d(m_1, n_1)$ in a matrix $D_{N_1, O_1}$ is defined as:

$$d(m_1, n_1) = e^{j\frac{2\pi}{O_1 N_1}m_1 n_1} \text{ or } d(m_1, n_1) = e^{-j\frac{2\pi}{O_1 N_1}m_1 n_1},$$

wherein $O_1$ and $N_1$ are preset values, both $O_1$ and $N_1$ are positive integers, $0 \leq m_1 \leq N_1-1$, and $0 \leq n_1 \leq O_1 N_1-1$,
wherein an element $d(m_2, n_2)$ in a matrix $D_{N_2, O_2}$ is defined as:

$$d(m_2, n_2) = e^{j\frac{2\pi}{O_2 N_2}m_2 n_2} \text{ or } d(m_2, n_2) = e^{-j\frac{2\pi}{O_2 N_2}m_2 n_2},$$

wherein $O_2$ and $N_2$ are preset values, both $O_2$ and $N_2$ are positive integers, $0 \leq m_2 \leq N_2-1$, and $0 \leq n_2 \leq O_2 N_2-1$,
wherein $\psi$ is a diagonal matrix, and an $i^{th}$ element $\Lambda_{ii}$ on a main diagonal of the diagonal matrix is defined as:
$\Lambda_{ii} = e^{jx}$, wherein $1 \leq i \leq O_1 O_2 N_1 N_2$, x is a codebook parameter, and $0 \leq x \leq 2\pi$; and
determining the ideal precoding vector based on the plurality of component vectors and the weight of each component vector.

12. The method according to claim 11, wherein the one or more basic codebooks include a second basic codebook defined as:

$$B = \begin{bmatrix} G & G \\ G\psi & -G\psi \end{bmatrix},$$

wherein B represents the second basic codebook and
$G = (L_{N_1}^{k_1} D_{N_1}) \otimes (L_{N_2}^{k_2} D_{N_2})$,
wherein an element $d(m_1, n_1)$ in a matrix $D_{N_1}$ is defined as:

$$d(m_1, n_1) = e^{j\frac{2\pi}{N_1}m_1 n_1} \text{ or } d(m_1, n_1) = e^{-j\frac{2\pi}{N_1}m_1 n_1},$$

wherein $N_1$ is a preset value, $N_1$ is a positive integer, $0 \leq m_1 \leq N_1-1$, and $0 \leq n_1 \leq N_1-1$,
wherein an element $d(m_2, n_2)$ in a matrix $D_{N_2}$ is defined as:

$$d(m_2, n_2) = e^{j\frac{2\pi}{N_2}m_2 n_2} \text{ or } d(m_2, n_2) = e^{-j\frac{2\pi}{N_2}m_2 n_2},$$

wherein $N_2$ is a preset value, $N_2$ is a positive integer, $0 \leq m_2 \leq N_2-1$, and $0 \leq n_2 \leq N_2-1$,
wherein $L_{N_1}^{k_1}$ is a diagonal matrix, and if $$d(m_1, n_1) = e^{j\frac{2\pi}{N_1}m_1 n_1},$$

the diagonal matrix $L_{N_1}^{k_1}$ is defined as:

$$L_{N_2}^{k_2} = \text{diag}\left(\left[e^{j\frac{2\pi k_2}{O_2 N_2}0}, e^{j\frac{2\pi k_2}{O_2 N_2}1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_1}^{k_1}$ is defined as:

$$L_{N_2}^{k_2} = \text{diag}\left(\left[e^{-j\frac{2\pi k_2}{O_2 N_2}0}, e^{-j\frac{2\pi k_2}{O_2 N_2}1}, \ldots, e^{-j\frac{2\pi k_2}{O_2 N_2}(N_2-1)}\right]\right),$$

wherein $O_1$ is a preset value, $O_1$ is a positive integer, $k_1$ is a first codebook parameter, $k_1$ is an integer, and $0 \leq k_1 \leq O_1-1$, and $L_{N_2}^{k_2}$ is a diagonal matrix,
wherein if $$d(m_2, n_2) = e^{j\frac{2\pi}{N_2}m_2 n_2},$$

the diagonal matrix $L_{N_2}^{k_2}$ is defined as:

$$L_{N_2}^{k_2} = \mathrm{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2} m_2 n_2},$$

the diagonal matrix $L_{N_2}^{k_2}$ is defined as:

$$L_{N_2}^{k_2} = \mathrm{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2 - 1$, wherein $\psi$ is a diagonal matrix, and an $i^{th}$ element $\Lambda_{ii}$ on a main diagonal of the diagonal matrix is defined as:

$\Lambda_{ii} = e^{jx}$, wherein $1 \leq i \leq O_1 O_2 N_1 N_2$, x is a third codebook parameter, and $0 \leq x \leq 2\pi$.

13. The method according to claim 11, wherein the one or more basic codebooks include a third basic codebook defined as:

$$B = \begin{bmatrix} (L_{N_1}^{k_1} D_{N_1}) \otimes (L_{N_2}^{k_2} D_{N_2}) & (L_{N_1}^{k_1} D_{N_1}) \otimes (L_{N_2}^{k_2} D_{N_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix},$$

wherein B represents the third basic codebook, and an element $d(m_1, n_1)$ in a matrix $D_{N_1}$ is defined as:

$$d(m_1, n_1) = e^{j\frac{2\pi}{N_1} m_1 n_1} \text{ or } d(m_1, n_1) = e^{-j\frac{2\pi}{N_1} m_1 n_1},$$

wherein $N_1$ is a preset value, $N_1$ is a positive integer, $0 \leq m_1 \leq N_1 - 1$; and $0 \leq n_1 \leq N_1 - 1$, wherein an element $d(m_2, n_2)$ in a matrix $D_{N_2}$ is defined as:

$$d(m_2, n_2) = e^{j\frac{2\pi}{N_2} m_2 n_2} \text{ or } d(m_2, n_2) = e^{-j\frac{2\pi}{N_2} m_2 n_2},$$

wherein $N_2$ is a preset value, $N_2$ is a positive integer, $0 \leq m_2 \leq N_2 - 1$, and $0 \leq n_2 \leq N_2 - 1$, wherein $L_{N_1}^{k_1}$ is a diagonal matrix, and if $$d(m_1, n_1) = e^{j\frac{2\pi}{N_1} m_1 n_1},$$

the diagonal matrix $L_{N_1}^{k_1}$ is defined as:

$$L_{N_1}^{k_1} = \mathrm{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$$

or
if $$d(m_1, n_1) = e^{-j\frac{2\pi}{N_1} m_1 n_1},$$

the diagonal matrix $L_{N_1}^{k_1}$ is defined as:

$$L_{N_1}^{k_1} = \mathrm{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \leq k_1 \leq O_1 - 1$, and $L_{N_2}^{k_2}$ is a diagonal matrix, wherein if $$d(m_2, n_2) = e^{j\frac{2\pi}{N_2} m_2 n_2},$$

the diagonal matrix $L_{N_2}^{k_2}$ is defined as:

$$L_{N_2}^{k_2} = \mathrm{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2} m_2 n_2},$$

the diagonal matrix $L_{N_2}^{k_2}$ is defined as:

$$L_{N_2}^{k_2} = \mathrm{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2 - 1$, wherein $R_{N_1}^{q_1}$ is a diagonal matrix, and if $$d(m_1, n_1) = e^{j\frac{2\pi}{N_1} m_1 n_1},$$

the diagonal matrix $R_{N_1}^{q_1}$ is defined as:

$$R_{N_1}^{q_1} = \mathrm{diag}\left(\left[e^{j\frac{2\pi q_1}{Q_3 N_1} 0}, e^{j\frac{2\pi q_1}{Q_3 N_1} 1}, \ldots, e^{j\frac{2\pi q_1}{Q_3 N_1}(N_1-1)}\right]\right),$$

or
if $$d(m_1, n_1) = e^{-j\frac{2\pi}{N_1} m_1 n_1},$$

the diagonal matrix $R_{N_1}^{q_1}$ is defined as:

$$R_{N_1}^{q_1} = \text{diag}\left(\left[e^{-j\frac{2\pi q_1}{Q_3 N_1} 0}, e^{-j\frac{2\pi q_1}{Q_3 N_1} 1}, \ldots, e^{-j\frac{2\pi q_1}{Q_3 N_1}(N_1-1)}\right]\right),$$

wherein $Q_1$ is a preset value, $Q_1$ is a positive integer, $q_1$ is a third codebook parameter, $q_1$ is an integer, and $-(Q_1-1) \leq q_1 \leq (Q_1-1)$, wherein $R_{N_2}^{q_2}$ is a diagonal matrix, and if $$d(m_2, n_2) = e^{j\frac{2\pi}{N_2} m_2 n_2},$$

the diagonal matrix $R_{N_2}^{q_2}$ is defined as:

$$R_{N_2}^{q_2} = \text{diag}\left(\left[e^{j\frac{2\pi q_2}{Q_4 N_2} 0}, e^{j\frac{2\pi q_2}{Q_4 N_2} 1}, \ldots, e^{j\frac{2\pi q_2}{Q_4 N_2}(N_2-1)}\right]\right),$$

or
if $$d(m_2, n_2) = e^{-j\frac{2\pi}{N_2} m_2 n_2},$$

the diagonal matrix $R_{N_2}^{q_2}$ is defined as:

$$R_{N_2}^{q_2} = \text{diag}\left(\left[e^{-j\frac{2\pi q_2}{Q_4 N_2} 0}, e^{-j\frac{2\pi q_2}{Q_4 N_2} 1}, \ldots, e^{-j\frac{2\pi q_2}{Q_4 N_2}(N_2-1)}\right]\right),$$

wherein $Q_2$ is a preset value, $Q_2$ is a positive integer, $q_2$ is a fourth codebook parameter, $q_2$ is an integer, and $-(Q_2-1) \leq q_2 \leq (Q_2-1)$.

14. The method according to claim 11, wherein the one or more basic codebooks include a fourth basic codebook defined as:

$$B = \begin{bmatrix} (L_{N_1}^{k_1} D_{N_1} R_{N_1}^{p_1}) \otimes (L_{N_2}^{k_2} D_{N_2} R_{N_2}^{p_2}) & (L_{N_1}^{k_1} D_{N_1} R_{N_1}^{p_1}) \otimes (L_{N_2}^{k_2} D_{N_2} R_{N_2}^{p_2}) \\ (L_{N_1}^{k_1} D_{N_1} R_{N_1}^{q_1}) \otimes (L_{N_2}^{k_2} D_{N_2} R_{N_2}^{q_2}) & -(L_{N_1}^{k_1} D_{N_1} R_{N_1}^{q_1}) \otimes (L_{N_2}^{k_2} D_{N_2} R_{N_2}^{q_2}) \end{bmatrix},$$

wherein B represents the fourth basic codebook, and an element $d(m_1, n_1)$ in a matrix $D_{N_1}$ is defined as:

$$d(m_1, n_1) = e^{j\frac{2\pi}{N_1} m_1 n_1} \text{ or } d(m_1, n_1) = e^{-j\frac{2\pi}{N_1} m_1 n_1},$$

wherein $N_1$ is a preset value, $N_1$ is a positive integer, $0 \leq m_1 \leq N_1 - 1$, and $0 \leq n_1 \leq N_1 - 1$, wherein an element $d(m_2, n_2)$ in a matrix $D_{N_2}$ is defined as:

$$d(m_2, n_2) = e^{j\frac{2\pi}{N_2} m_2 n_2} \text{ or } d(m_2, n_2) = e^{-j\frac{2\pi}{N_2} m_2 n_2},$$

wherein $N_2$ is a preset value, $N_2$ is a positive integer, $0 \leq m_2 \leq N_2 - 1$, and $0 \leq n_2 \leq N_2 - 1$, wherein $L_{N_1}^{k_1}$ is a diagonal matrix, and if $$d(m_1, n_1) = e^{j\frac{2\pi}{N_1} m_1 n_1},$$

the diagonal matrix $L_{N_1}^{k_1}$ is defined as:

$$L_{N_1}^{k_1} = \text{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$$

or
if $$d(m_1, n_1) = e^{-j\frac{2\pi}{N_1} m_1 n_1},$$

the diagonal matrix $L_{N_1}^{k_1}$ is defined as:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

wherein $O_1$ is a preset valise, $O_1$ is a positive integer, $k_1$ is a first codebook parameter, $k_1$ is an integer, and $0 \leq k_1 \leq O_1 = 1$, wherein $L_{N_2}^{k_2}$ is a diagonal matrix, and if $$d(m_2, n_2) = e^{j\frac{2\pi}{N_2} m_2 n_2},$$

the diagonal matrix $L_{N_2}^{k_2}$ is defined as:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

if $$d(m_2, n_2) = e^{-j\frac{2\pi}{N_2} m_2 n_2},$$

the diagonal matrix $L_{N_2}^{k_2}$ is defined as:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2 = 1$, herein $R_{N_1}^{p_1}$ is a diagonal matrix; and if $$d(m_1, n_1) = e^{j\frac{2\pi}{N_1} m_1 n_1},$$

the diagonal matrix $R_{N_1}^{p_1}$ is defined as:

$$R_{N_1}^{p_1} = \text{diag}\left(\left[e^{j\frac{2\pi p_1}{Q_1 N_1}0}, e^{j\frac{2\pi p_1}{Q_1 N_1}1}, \ldots, e^{j\frac{2\pi p_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{p_1}$ is defined as:

$$R_{N_1}^{p_1} = \text{diag}\left(\left[e^{-j\frac{2\pi p_1}{Q_1 N_1}0}, e^{-j\frac{2\pi p_1}{Q_1 N_1}1}, \ldots, e^{-j\frac{2\pi p_1}{Q_1 N_1}(N_1-1)}\right]\right),$$

wherein $Q_1$ is a preset value, $Q_1$ is a positive integer, $p_1$ is a third codebook parameter, $p_1$ is an integer, and $0 \leq p_1 \leq (Q_1 - 1)$;
$R_{N_2}^{p_2}$ is a diagonal matrix; and if $$d(m_2, n_2) = e^{j\frac{2\pi}{N_2}m_2 n_2},$$

the diagonal matrix $R_{N_2}^{p_2}$ is defined as:

$$R_{N_2}^{p_2} = \text{diag}\left(\left[e^{j\frac{2\pi p_2}{Q_2 N_2}0}, e^{j\frac{2\pi p_2}{Q_2 N_2}1}, \ldots, e^{j\frac{2\pi p_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{p_2}$ is defined as:

$$R_{N_2}^{p_2} = \text{diag}\left(\left[e^{-j\frac{2\pi p_2}{Q_2 N_2}0}, e^{-j\frac{2\pi p_2}{Q_2 N_2}1}, \ldots, e^{-j\frac{2\pi p_2}{Q_2 N_2}(N_2-1)}\right]\right),$$

wherein $Q_2$ is a preset value, $Q_2$ is a positive integer, $p_2$ is a fourth codebook parameter, $p_2$ is an integer, and $0 \leq p_2 \leq (Q_2 - 1)$,
wherein $R_{N_1}^{q_1}$ is a diagonal matrix; and if $$d(m_1, n_1) = e^{j\frac{2\pi}{N_1}m_1 n_1},$$

the diagonal matrix $R_{N_1}^{q_1}$ is defined as:

$$R_{N_1}^{q_1} = \text{diag}\left(\left[e^{j\frac{2\pi q_1}{Q_3 N_1}0}, e^{j\frac{2\pi q_1}{Q_3 N_1}1}, \ldots, e^{j\frac{2\pi q_1}{Q_3 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ is defined as:

$$R_{N_1}^{q_1} = \text{diag}\left(\left[e^{-j\frac{2\pi q_1}{Q_3 N_1}0}, e^{-j\frac{2\pi q_1}{Q_3 N_1}1}, \ldots, e^{-j\frac{2\pi q_1}{Q_3 N_1}(N_1-1)}\right]\right),$$

wherein $Q_3$ is a preset value, $Q_3$ is a positive integer, $q_1$ is a fifth codebook parameter, $q_1$ is an integer, and $0 \leq q_1 \leq (Q_3 - 1)$,
wherein $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ is defined as:

$$R_{N_2}^{q_2} = \text{diag}\left(\left[e^{j\frac{2\pi q_2}{Q_4 N_2}0}, e^{j\frac{2\pi q_2}{Q_4 N_2}1}, \ldots, e^{j\frac{2\pi q_2}{Q_4 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ is defined as:

$$R_{N_2}^{q_2} = \text{diag}\left(\left[e^{-j\frac{2\pi q_2}{Q_4 N_2}0}, e^{-j\frac{2\pi q_2}{Q_4 N_2}1}, \ldots, e^{-j\frac{2\pi q_2}{Q_4 N_2}(N_2-1)}\right]\right),$$

wherein $Q_4$ is a preset value, $Q_4$ is a positive integer, $q_2$ is a sixth codebook parameter, $q_2$ is an integer, and $0 \leq q_2 \leq (Q_4 - 1)$.

15. The method according to claim 11, wherein the one or more basic codebooks include a fifth basic codebook defined as:

$$B = \begin{bmatrix} (L_{N_1}^{k_1} D_{N_1} R_{N_1}^{q_1}) \otimes (L_{N_2}^{k_2} D_{N_2} R_{N_2}^{q_2}) & (L_{N_1}^{k_1} D_{N_1} R_{N_1}^{q_1}) \otimes (L_{N_2}^{k_2} D_{N_2} R_{N_2}^{q_2}) \\ (L_{N_1}^{k_1} D_{N_1}) \otimes (L_{N_2}^{k_2} D_{N_2}) & -(L_{N_1}^{k_1} D_{N_1}) \otimes (L_{N_2}^{k_2} D_{N_2}) \end{bmatrix},$$

wherein B represents the fifth basic codebook, and an element $d(m_1, n_1)$ in a matrix $D_{N_1}$ is defined as:

$$d(m_1, n_1) = e^{j\frac{2\pi}{N_1}m_1 n_1} \text{ or } d(m_1, n_1) = e^{-j\frac{2\pi}{N_1}m_1 n_1},$$

wherein $N_1$ is a preset value, $N_1$ is a positive integer, $0 \leq m_1 \leq N_1 - 1$, and $0 \leq n_1 \leq N_1 - 1$, wherein an element $d(m_2, n_2)$ in a matrix $D_{N_1}$ is defined as:

$$d(m_2, n_2) = e^{j\frac{2\pi}{N_2}m_2 n_2} \text{ or } d(m_2, n_2) = e^{-j\frac{2\pi}{N_2}m_2 n_2},$$

wherein $N_2$ is a preset value, $N_2$ is a positive integer, $0 \leq m_2 \leq N_2-1$, $0 \leq n_2 \leq N_2-1$, wherein $L_{N_1}^{k_1}$ is a diagonal matrix; and if $$d(m_1, n_1) = e^{j\frac{2\pi}{N_1}m_1 n_1},$$

wherein the diagonal matrix $L_{N_1}^{k_1}$ is defined as:

$$L_{N_1}^{k_1} = \text{diag}\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$$

or
if $$d(m_1, n_1) = e^{-j\frac{2\pi}{N_1}m_1 n_1},$$

the diagonal matrix $L_{N_1}^{k_1}$ is defined as:

$$L_{N_1}^{k_1} = \text{diag}\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$$

wherein $O_1$ is a preset value, $O_1$ is a positive integer, $k_1$ is a first codebook parameter, $k_1$ is an integer, and $0 \leq k_1 \leq O_1-1$, wherein $L_{N_2}^{k_2}$ is a diagonal matrix; and if $$d(m_2, n_2) = e^{j\frac{2\pi}{N_2}m_2 n_2},$$

the diagonal matrix $L_{N_2}^{k_2}$ is defined as:

$$L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$$

or
if $$d(m_2, n_2) = e^{-j\frac{2\pi}{N_2}m_2 n_2},$$

the diagonal matrix $L_{N_2}^{k_2}$ is defined as:

$$L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$$

wherein $O_2$ is a preset value, $O_2$ is a positive integer, $k_2$ is a second codebook parameter, $k_2$ is an integer, and $0 \leq k_2 \leq O_2-1$, wherein $R_{N_1}^{q_1}$ is a diagonal matrix, and if $$d(m_1, n_1) = e^{j\frac{2\pi}{N_1}m_1 n_1},$$

the diagonal matrix $R_{N_1}^{q_1}$ is defined as:

$$R_{N_1}^{q_1} = \text{diag}\left(\left[e^{j\frac{2\pi q_1}{Q_1 N_1} 0}, e^{j\frac{2\pi q_1}{Q_1 N_1} 1}, \ldots, e^{j\frac{2\pi q_1}{Q_1 N_1}(N_1-1)}\right]\right),$$

or
if $$d(m_1, n_1) = e^{-j\frac{2\pi}{N_1}m_1 n_1},$$

the diagonal matrix $R_{N_1}^{q_1}$ is defined as:

$$R_{N_1}^{q_1} = \text{diag}\left(\left[e^{-j\frac{2\pi q_1}{Q_1 N_1} 0}, e^{-j\frac{2\pi q_1}{Q_1 N_1} 1}, \ldots, e^{-j\frac{2\pi q_1}{Q_1 N_1}(N_1-1)}\right]\right),$$

wherein $Q_1$ is a preset value, $Q_1$ is a positive integer, $q_1$ is a third codebook parameter, $q_1$ is an integer, and $-(Q_1-1) \leq q_1 \leq (Q_1-1)$, wherein $R_{N_2}^{q_2}$ is a diagonal matrix; and if $$d(m_2, n_2) = e^{j\frac{2\pi}{N_2}m_2 n_2},$$

the diagonal matrix $R_{N_2}^{q_2}$ is defined as:

$$R_{N_2}^{q_2} = \text{diag}\left(\left[e^{j\frac{2\pi q_2}{Q_2 N_2} 0}, e^{j\frac{2\pi q_2}{Q_2 N_2} 1}, \ldots, e^{j\frac{2\pi q_2}{Q_2 N_2}(N_2-1)}\right]\right),$$

or
if $$d(m_2, n_2) = e^{-j\frac{2\pi}{N_2}m_2 n_2},$$

the diagonal matrix $R_{N_2}^{q_2}$ is defined as:

$$R_{N_2}^{q_2} = \text{diag}\left(\left[e^{-j\frac{2\pi q_2}{Q_2 N_2} 0}, e^{-j\frac{2\pi q_2}{Q_2 N_2} 1}, \ldots, e^{-j\frac{2\pi q_2}{Q_2 N_2}(N_2-1)}\right]\right),$$

wherein $Q_2$ is a preset value, $Q_2$ is a positive integer, $q_2$ is a fourth codebook parameter, $q_2$ is an integer, and $-(Q_2-1) \leq q_2 \leq (Q_2-1)$.

* * * * *

UNITED STATES PATENT AND TRADEMARK OFFICE
CERTIFICATE OF CORRECTION

PATENT NO. : 11,063,640 B2  
APPLICATION NO. : 16/459581  
DATED : July 13, 2021  
INVENTOR(S) : Huangping Jin et al.

It is certified that error appears in the above-identified patent and that said Letters Patent is hereby corrected as shown below:

In the Claims

In Claim 2, Column 35, Line 16-21, "$d(m_1, n_1) = e^{j\frac{2\pi}{O_1 N_1} m_1 n_1}$ or $d(m_1, n_1) = e^{-j\frac{2\pi}{O_1 N_1} m_1 n_1}$,"

should be -- $d(m_1, n_1) = e^{j\frac{2\pi}{N_1} m_1 n_1}$ or $d(m_1, n_1) = e^{-j\frac{2\pi}{N_1} m_1 n_1}$ --.

In Claim 2, Column 35, Line 25-30, "$d(m_2, n_2) = e^{j\frac{2\pi}{O_2 N_2} m_2 n_2}$ or $d(m_2, n_2) = e^{-j\frac{2\pi}{O_2 N_2} m_2 n_2}$,"

should be -- $d(m_2, n_2) = e^{j\frac{2\pi}{N_2} m_2 n_2}$ or $d(m_2, n_2) = e^{-j\frac{2\pi}{N_2} m_2 n_2}$ --.

In Claim 4, Column 41, Line 2-5, "$R_{N_1}^{q_1} = \text{diag}([e^{j\frac{2\pi q_1}{O_1 N_1} 0}, e^{j\frac{2\pi q_1}{O_1 N_1} 1}, \ldots, e^{j\frac{2\pi q_1}{O_1 N_1}(N_1-1)}])$,"

should be -- $R_{N_1}^{q_1} = \text{diag}\left(\left[e^{j\frac{2\pi q_1}{O_1 N_1} 0}, e^{j\frac{2\pi q_1}{O_1 N_1} 1}, \ldots, e^{j\frac{2\pi q_1}{O_1 N_1}(N_1-1)}\right]\right)$ --.

In Claim 4, Column 41, Line 15-18, "$R_{N_1}^{q_1} = \text{diag}([e^{-j\frac{2\pi q_1}{O_1 N_1} 0}, e^{-j\frac{2\pi q_1}{O_1 N_1} 1}, \ldots, e^{-j\frac{2\pi q_1}{O_1 N_1}(N_1-1)}])$," should be -- $R_{N_1}^{q_1} = \text{diag}\left(\left[e^{-j\frac{2\pi q_1}{O_1 N_1} 0}, e^{-j\frac{2\pi q_1}{O_1 N_1} 1}, \ldots, e^{-j\frac{2\pi q_1}{O_1 N_1}(N_1-1)}\right]\right)$ --.

Signed and Sealed this  
Twenty-second Day of November, 2022

Katherine Kelly Vidal  
*Director of the United States Patent and Trademark Office*

CERTIFICATE OF CORRECTION (continued)

In Claim 5, Column 43, Line 55-59, " $R_{N_2}^{q_2} = \text{diag}\left(\left[e^{-j\frac{2\pi q_2}{Q_4 N_2}0}, e^{-j\frac{2\pi q_2}{Q_4 N_2}1}, \ldots, e^{-j\frac{2\pi q_2}{Q_4 N_2}(N_2-1)}\right]\right),$ "

should be -- $R_{N_2}^{q_2} = diag\left(\left[e^{-j\frac{2\pi q_2}{O_2 N_2}0}, e^{-j\frac{2\pi q_2}{O_2 N_2}1}, \ldots, e^{-j\frac{2\pi q_2}{O_2 N_2}(N_2-1)}\right]\right)$ --.

In Claim 6, Column 44, Line 18-22, " $d(m_1, n_1) = e^{j\frac{2\pi}{N_1}m_1 n_1}$ or $d(m_1, n_1) = e^{-j\frac{2\pi}{N_1}m_1 n_1}$ , "

should be -- $d(m_1, n_1) = e^{j\frac{2\pi}{O_1 N_1}m_1 n_1}$ or $d(m_1, n_1) = e^{-j\frac{2\pi}{O_1 N_1}m_1 n_1}$ --.

In Claim 6, Column 44, Line 28-32, " $d(m_2, n_2) = e^{j\frac{2\pi}{N_2}m_2 n_2}$ or $d(m_2, n_2) = e^{-j\frac{2\pi}{N_2}m_2 n_2}$ , "

should be -- $d(m_2, n_2) = e^{j\frac{2\pi}{O_2 N_2}m_2 n_2}$ or $d(m_2, n_2) = e^{-j\frac{2\pi}{O_2 N_2}m_2 n_2}$ --.

In Claim 7, Column 44, Line 60-64, " $d(m_1, n_1) = e^{j\frac{2\pi}{O_1 N_1}m_1 n_1}$ or $d(m_1, n_1) = e^{-j\frac{2\pi}{O_1 N_1}m_1 n_1}$ , "

should be -- $d(m_1, n_1) = e^{j\frac{2\pi}{N_1}m_1 n_1}$ or $d(m_1, n_1) = e^{-j\frac{2\pi}{N_1}m_1 n_1}$ --.

In Claim 7, Column 45, Line 2-7, " $d(m_2, n_2) = e^{j\frac{2\pi}{O_2 N_2}m_2 n_2}$ or $d(m_2, n_2) = e^{-j\frac{2\pi}{O_2 N_2}m_2 n_2}$ ," should be -- $d(m_2, n_2) = e^{j\frac{2\pi}{N_2}m_2 n_2}$ or $d(m_2, n_2) = e^{-j\frac{2\pi}{N_2}m_2 n_2}$ --.

In Claim 9, Column 50, Line 46-50, " $R_{N_1}^{q_1} = \text{diag}\left(\left[e^{-j\frac{2\pi q_1}{Q_1 N_1}0}, e^{-j\frac{2\pi q_1}{Q_1 N_1}1}, \ldots, e^{-j\frac{2\pi q_1}{Q_1 N_1}(N_1-1)}\right]\right),$ "

should be -- $R_{N_1}^{q_1} = diag\left(\left[e^{-j\frac{2\pi q_1}{O_1 N_1}0}, e^{-j\frac{2\pi q_1}{O_1 N_1}1}, \ldots, e^{-j\frac{2\pi q_1}{O_1 N_1}(N_1-1)}\right]\right)$ --.

CERTIFICATE OF CORRECTION (continued)
U.S. Pat. No. 11,063,640 B2

In Claim 9, Column 50, Line 65, " $R_{N_2}^{q_2} = \text{diag}\left(\left[e^{j\frac{2\pi q_2}{Q_2 N_2} 0}, e^{j\frac{2\pi q_2}{Q_2 N_2} 1}, \ldots, e^{j\frac{2\pi q_2}{Q_2 N_2}(N_2-1)}\right]\right),$ "

should be -- $R_{N_2}^{q_2} = diag\left(\left[e^{j\frac{2\pi q_2}{Q_4 N_2} 0}, e^{j\frac{2\pi q_2}{Q_4 N_2} 1}, \ldots, e^{j\frac{2\pi q_2}{Q_4 N_2}(N_2-1)}\right]\right),$ --.

In Claim 9, Column 51, Line 8-11, " $R_{N_2}^{q_2} = \text{diag}\left(\left[e^{-j\frac{2\pi q_2}{Q_2 N_2} 0}, e^{-j\frac{2\pi q_2}{Q_2 N_2} 1}, \ldots, e^{-j\frac{2\pi q_2}{Q_2 N_2}(N_2-1)}\right]\right),$ " should be -- $R_{N_2}^{q_2} = diag\left(\left[e^{-j\frac{2\pi q_2}{Q_4 N_2} 0}, e^{-j\frac{2\pi q_2}{Q_4 N_2} 1}, \ldots, e^{-j\frac{2\pi q_2}{Q_4 N_2}(N_2-1)}\right]\right),$ --.

In Claim 10, Column 51, Line 40, "0≤m₂≤N₂−1, and 0≤n₁≤N₁−1," should be -- $0 \leq m_2 \leq N_2 - 1$, and $0 \leq n_2 \leq N_2 - 1$, --.

In Claim 10, Column 52, Line 60-64, " $R_{N_1}^{q_1} = \text{diag}\left(\left[e^{-j\frac{2\pi q_1}{Q_3 N_1} 0}, e^{-j\frac{2\pi q_1}{Q_3 N_1} 1}, \ldots, e^{-j\frac{2\pi q_1}{Q_3 N_1}(N_1-1)}\right]\right),$ " should be -- $R_{N_1}^{q_1} = diag\left(\left[e^{-j\frac{2\pi q_1}{Q_1 N_1} 0}, e^{-j\frac{2\pi q_1}{Q_1 N_1} 1}, \ldots, e^{-j\frac{2\pi q_1}{Q_1 N_1}(N_1-1)}\right]\right),$ --.

In Claim 12, Column 54, Line 40-44, " $L_{N_2}^{k_2} = \text{diag}\left(\left[e^{j\frac{2\pi k_2}{O_2 N_2} 0}, e^{j\frac{2\pi k_2}{O_2 N_2} 1}, \ldots, e^{j\frac{2\pi k_2}{O_2 N_2}(N_2-1)}\right]\right),$ "

should be -- $L_{N_1}^{k} = diag\left(\left[e^{j\frac{2\pi k_1}{O_1 N_1} 0}, e^{j\frac{2\pi k_1}{O_1 N_1} 1}, \ldots, e^{j\frac{2\pi k_1}{O_1 N_1}(N_1-1)}\right]\right),$ --.

In Claim 12, Column 54, Line 53-57, " $L_{N_2}^{k_2} = \text{diag}\left(\left[e^{-j\frac{2\pi k_2}{O_2 N_2} 0}, e^{-j\frac{2\pi k_2}{O_2 N_2} 1}, \ldots, e^{-j\frac{2\pi k_2}{O_2 N_2}(N_2-1)}\right]\right),$ "

should be -- $L_{N_1}^{k} = diag\left(\left[e^{-j\frac{2\pi k_1}{O_1 N_1} 0}, e^{-j\frac{2\pi k_1}{O_1 N_1} 1}, \ldots, e^{-j\frac{2\pi k_1}{O_1 N_1}(N_1-1)}\right]\right),$ --.

CERTIFICATE OF CORRECTION (continued)
U.S. Pat. No. 11,063,640 B2

In Claim 13, Column 57, Line 2-7, " $R_{N_1}^{q_1} = \text{diag}\left(\left[e^{-j\frac{2\pi q_1}{Q_3 N_2}0}, e^{-j\frac{2\pi q_1}{Q_3 N_1}1}, \ldots, e^{-j\frac{2\pi q_1}{Q_3 N_1}(N_1-1)}\right]\right),$ "

should be -- $R_{N_1}^{q_1} = diag\left(\left[e^{-j\frac{2\pi q_1}{Q_3 N_1}0}, e^{-j\frac{2\pi q_1}{Q_3 N_1}1}, \ldots, e^{-j\frac{2\pi q_1}{Q_3 N_1}(N_1-1)}\right]\right)$ --.

In Claim 13, Column 57, Line 18-23, " $R_{N_2}^{q_2} = \text{diag}\left(\left[e^{j\frac{2\pi q_2}{Q_4 N_2}0}, e^{j\frac{2\pi q_2}{Q_4 N_2}1}, \ldots, e^{j\frac{2\pi q_2}{Q_4 N_2}(N_2-1)}\right]\right),$ "

should be -- $R_{N_2}^{q_2} = diag\left(\left[e^{j\frac{2\pi q_2}{Q_3 N_2}0}, e^{j\frac{2\pi q_2}{Q_3 N_2}1}, \ldots, e^{j\frac{2\pi q_2}{Q_3 N_2}(N_2-1)}\right]\right)$ --.

In Claim 13, Column 57, Line 32-37, " $R_{N_2}^{q_2} = \text{diag}\left(\left[e^{-j\frac{2\pi q_2}{Q_4 N_2}0}, e^{-j\frac{2\pi q_2}{Q_4 N_2}1}, \ldots, e^{-j\frac{2\pi q_2}{Q_4 N_2}(N_2-1)}\right]\right),$ "

should be -- $R_{N_2}^{q_2} = diag\left(\left[e^{-j\frac{2\pi q_2}{Q_3 N_2}0}, e^{-j\frac{2\pi q_2}{Q_3 N_2}1}, \ldots, e^{-j\frac{2\pi q_2}{Q_3 N_2}(N_2-1)}\right]\right)$ --.

In Claim 14, Column 60, Line 17, "0≤q$_1$≤(Q$_3$=1)," should be -- $0 \leq q_1 \leq (Q_3 - 1)$, --.

In Claim 14, Column 60, Line 48, "0≤q$_2$≤(Q$_4$=1)." should be -- $0 \leq q_2 \leq (Q_4 - 1)$. --.

In Claim 15, Column 61, Line 1, "wherein an element d(m$_2$,n$_2$) in a matrix $D_{N_1}$ is defined as:" should be -- wherein an element $d(m_2,n_2)$ in a matrix $D_{N_2}$ is defined as: --.